(12) United States Patent
Kwon et al.

(10) Patent No.: US 8,448,038 B2
(45) Date of Patent: May 21, 2013

(54) METHOD FOR TRANSMITTING DATA USING HARQ

(75) Inventors: Woo Suk Kwon, Anyang-si (KR); Suk Woo Lee, Anyang-si (KR); Ji Ae Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 334 days.

(21) Appl. No.: 12/920,842

(22) PCT Filed: Mar. 31, 2009

(86) PCT No.: PCT/KR2009/001657
§ 371 (c)(1),
(2), (4) Date: Sep. 3, 2010

(87) PCT Pub. No.: WO2009/145454
PCT Pub. Date: Dec. 3, 2009

(65) Prior Publication Data
US 2011/0022918 A1    Jan. 27, 2011

(30) Foreign Application Priority Data

Mar. 31, 2008  (KR) .................. 10-2008-0029909
Aug. 29, 2008  (KR) .................. 10-2008-0085018

(51) Int. Cl.
   *G08C 25/02*     (2006.01)
(52) U.S. Cl.
   USPC ............ 714/748; 714/751; 375/295; 370/335

(58) Field of Classification Search
   USPC .................... 714/748, 751; 370/335; 375/295
   See application file for complete search history.

(56) References Cited

U.S. PATENT DOCUMENTS

| | | | |
|---|---|---|---|
| 6,615,382 B1 | 9/2003 | Kang et al. | |
| 7,283,509 B2 | 10/2007 | Moon et al. | |
| 2003/0039229 A1* | 2/2003 | Ostman | 370/335 |
| 2003/0072292 A1 | 4/2003 | Yoon et al. | |
| 2003/0147474 A1* | 8/2003 | Ha et al. | 375/295 |
| 2003/0217319 A1* | 11/2003 | Tripathi et al. | 714/751 |

FOREIGN PATENT DOCUMENTS

EP    1294120 A1    3/2003

* cited by examiner

*Primary Examiner* — Sam Rizk
(74) *Attorney, Agent, or Firm* — Birch, Stewart, Kolasch & Birch, LLP

(57) ABSTRACT

A data transmission method using an HARQ includes transmitting a first transmission block which is a portion of bit streams of a mother codeword, receiving a retransmission request with respect to the mother codeword, and transmitting a second transmission block which is a bit stream subsequent to the first transmission block, according to the retransmission request, wherein a modulation order obtained from a first range of a modulation order product code rate (MPR) is applied to the first transmission block, a modulation order obtained from a second range of the MPR according to the number of retransmissions is applied to the second transmission block, and the second range of the MPR is adjusted as much as a linear offset to the first range.

10 Claims, 14 Drawing Sheets

METHOD FOR TRANSMITTING DATA USING HARQ

CROSS REFERENCE TO RELATED APPLICATIONS

This application is the National Phase of PCT/KR2009/001657 filed on Mar. 31, 2009, which claims priority under 35 U.S.C. 119(e) to U.S. Provisional Application No. 61/151,476 filed on Feb. 10, 2009 and under 35 U.S.C. 119(a) to patent application Ser. No. 10-2008-0029909 filed in Republic of Korea, on Mar. 31, 2008 and to patent application Ser. No. 10-2008-0085018 filed in Republic of Korea, on Aug. 29, 2008, all of which are hereby expressly incorporated by reference into the present application.

TECHNICAL FIELD

The present invention relates to wireless communication and, more particularly, to a data transmission method using hybrid automatic repeat request (HARQ).

BACKGROUND ART

An error compensation technique for ensuring reliability of communication includes a forward error correction (FEC) scheme and an automatic repeat request (ARQ) scheme. In the FEC scheme, an error at a reception end is corrected by adding an extra error correction code to information bits. In the ARQ scheme, an error is corrected through data retransmission, for which a stop and wait (SAW) scheme, a go-back-N (GBN) scheme, a selective repeat (SR) scheme, and the like, are used. The SAW scheme is a scheme in which whether or not a transmitted frame has been properly received is first checked and a next frame is then transmitted. The GBN scheme is a scheme in which N number of successive frames is transmitted, and if the transmission is not successful, every transmitted frame following an error-generated (erroneous) frame is retransmitted. The SR scheme is a scheme in which only an error-generated frame is selectively retransmitted.

The FEC scheme is advantageous in that a time delay is small and there is no need to transmit and receive any extra information between a transmission end and a reception end, but a system efficiency is degraded in a good channel environment. The ARQ scheme has a high transmission reliability but is disadvantageous in that a time delay occurs and the system efficiency is degraded in a poor channel environment. Thus, in order to resolve such shortcomings, a hybrid automatic repeat request (HARQ) scheme combining the FEC and ARQ has been proposed. According to the HARQ scheme, whether or not data received by a physical layer has an error that cannot be decoded is checked, and if the data has an error, data retransmission is requested to thus enhance performance.

A mode of the HARQ may be divided into a chase combining mode and an incremental redundancy (IR) mode. The chase combining mode is obtaining a signal-to-noise ratio (SNR) gain by combining an error-detected data with retransmitted data, rather than discarding the error-detected data. The IR mode is incrementally transmitting additional redundant information in retransmitted data to thereby reduce a burden of retransmission and obtain a coding gain.

If no error is detected from the received data, a receiver transmits an acknowledgement (ACK) signal as a response signal to inform a transmitter about the successful reception. If an error is detected from the received data, the receiver transmits a negative-acknowledgement (NACK) signal as a response signal to inform the transmitter about the error detection. Upon receiving the NACK signal, the transmitter may retransmit data.

The receiver of the HARQ scheme basically attempts an error correction on received data and determines whether data retransmission should be made by using an error detection code. As the error detection code, a cyclic redundancy check (CRC) may be used. When the reception data is detected to have an error through the CRC detection process, the receiver transmits the NACK signal to the transmitter. Upon receiving the NACK signal, the transmitter transmits proper retransmission data according to the HARQ mode (Chase combining mode or IR mode). Upon receiving the retransmission data, the receiver combines the previous data and the retransmission data and decodes the same to thus improve reception performance.

The retransmission scheme of the HARQ may be classified into a synchronous scheme and an asynchronous scheme. In the synchronous HARQ, data is retransmitted at a point of time both the transmitter and the receiver knows about, and signaling required for transmission of data such as HARQ processor number or the like can be reduced. In the asynchronous HARQ, resources are allocated at an arbitrary time for retransmission. Because signaling is required for data transmission, overhead is generated.

The HARQ may be classified into an adaptive HARQ and a non-adaptive HARQ according to transmission attributes such as a resource allocation, modulation scheme, size of a transport block, and the like. The adaptive HARQ is a scheme in which the transmission attributes used for retransmission are compared with an initial transmission, and entirely or partially changed and transmitted according to a change in a channel state. The non-adaptive HARQ is a scheme in which the transmission attributes used for an initial transmission are continuously used regardless of a change in the channel state.

In the IR mode, retransmission data, which discriminately includes additional redundant information incrementally added to previously transmitted data, does not need to be transmitted with the same size as that of the initial transmission data like the non-adaptive HARQ. That is, transmitting the retransmission data with the same size as that of the initial transmission data is a waste of radio resources. And the use of the transmission attributes used for the initial transmission as it is each time cannot properly reflect a changed channel state when the retransmission data is transmitted.

In general, the need of retransmission means that a channel state is not good, and the retransmission data needs to be transmitted by using a modulation scheme with a good decoding performance. Thus, in the non-adaptive HARQ scheme in which the re-transmission data is transmitted in the IR mode, a method for enhancing efficiency of retransmission data is required.

DISCLOSURE OF INVENTION

Technical Problem

Therefore, an object of the present invention is to provide a data transmission method using an HARQ.

Technical Solution

In an aspect, a data transmission method using an HARQ includes transmitting a first transmission block which is a portion of bit streams of a mother codeword, receiving a retransmission request with respect to the mother codeword, and transmitting a second transmission block which is a bit stream subsequent to the first transmission block, according to the retransmission request, wherein a modulation order obtained from a first range of a modulation order product code rate (MPR) is applied to the first transmission block, a modulation order obtained from a second range of the MPR according to the number of retransmissions is applied to the second transmission block, and the second range of the MPR is adjusted as much as a linear offset to the first range.

In another aspect, a data transmission method using an HARQ, includes transmitting initial data, and transmitting retransmission data according to a retransmission request with respect to the initial data, wherein a modulation order obtained according to a basis changing according to the number of transmissions is applied to the re-transmission data.

Advantageous Effects

In a non-adaptive HARQ scheme of IR mode, in transmitting retransmission data, a modulation order lower than that applied to initial data can be applied to the re-transmission data, and efficiency of data transmission can be enhanced.

MODE FOR THE INVENTION

Exemplary embodiments of the present invention will now be described in detail with reference to the accompanying drawings.

Figure 1:
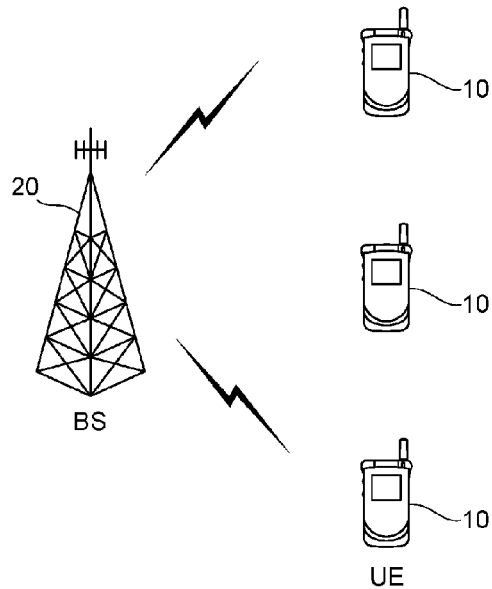
FIG. 1 illustrates a wireless communication system.

FIG. 1 shows a wireless communication system. The wireless communication system is widely used to provide a variety of communication services such as communication of voice, packet data, etc.

Referring to FIG. 1, the wireless communication system includes a base station (BS) 20 and user equipments (UEs) 10. The UEs 10 may be fixed or mobile, and may be referred to by other names such as mobile station (MS), user terminal (UT), subscriber station (SS), wireless device, etc. The BS 20 generally refers to a fixed station that communicates with the UEs 10 and may be called by other names such as node-B, base transceiver system (BTS), access point (AP), etc. One or more cells may exist within the coverage of the BS 20.

Hereinafter, downlink refers to communication link from the BS 20 to the UEs 10, and uplink refers to communication link from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. The OFDM uses orthogonality characteristics between IFFT (Inverse Fast Fourier Transform) and FFT (Fast Fourier Transform). The transmitter performs IFFT on data and transmits the same. The receiver performs FFT on received data to restore the original data. The transmitter uses IFFT to combine multiple sub-carriers, and the receiver uses corresponding FFT to split the multiple subcarriers.

Figure 2:
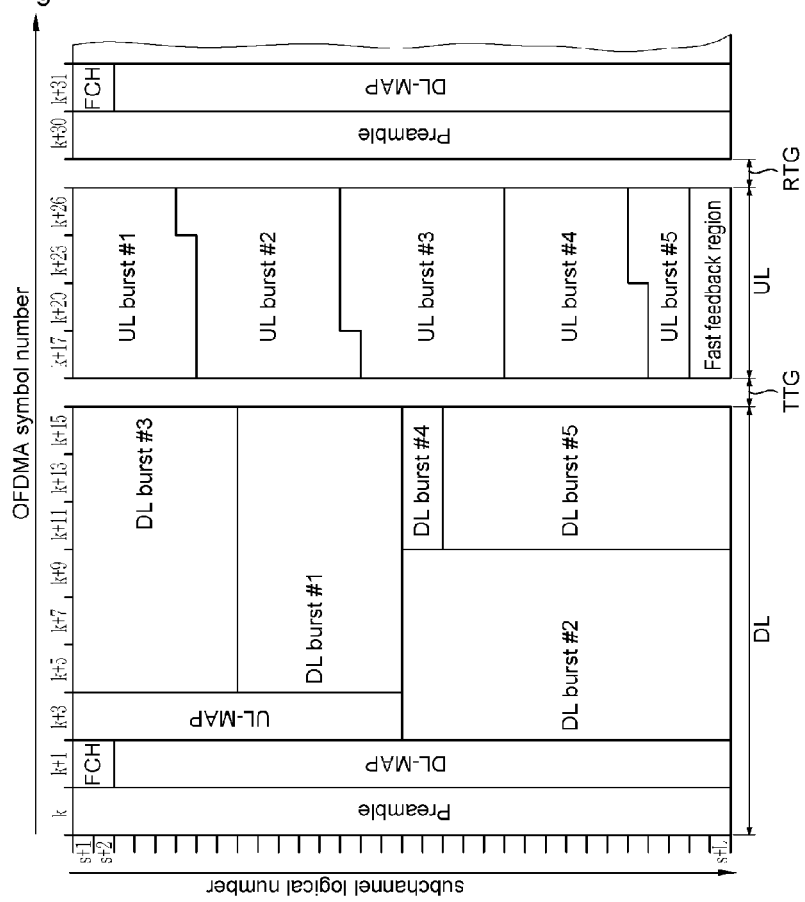
FIG. 2 illustrates an example of a frame structure.

FIG. 2 is a block diagram showing an example of a frame structure. The frame is a data sequence during a fixed time period used by physical specifications. It may refer to the paragraph 8.4.4.2 of "Part 16: Air Interface for Fixed Broadband Wireless Access Systems" of IEEE standards 802.16-2004 (referred to as 'Reference document 1', hereinafter).

Referring to FIG. 2, the frame includes a downlink (DL) frame and an uplink (UL) frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL-MAP, a UL-MAP, burst regions, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between a downlink burst and a subsequent uplink burst. A receive/transmit transition gap (RTG) refers to a gap between the uplink burst and a subsequent downlink burst.

The preamble is used for initial synchronization between a base station and a UE, cell search, frequency offset, and channel estimation. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to the characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to the characteristics of an uplink physical channel, and the UCD is periodically transmitted by the base station via a UCD message.

A fast feedback region is included in a portion of the uplink frame. The fast feedback region is allocated for a fast uplink transmission compared with general uplink data, in which channel quality information (CQI) or an ACK/NACK signal may be included. The fast feedback region may be positioned anywhere in the uplink frame and not necessarily limited to the illustrated position or size.

Hereinafter, a slot is a minimum available data allocation unit and defined as time and a subchannel. The number of subchannels depends upon the size of FFT and time-frequency mapping. Subchannels include a plurality of subcarriers. The number of sub-carriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. Reference document 1 discloses permutations such as FUSC, PUSC, O-FUSC (Optional-FUSC), O-PUSC (Optional-PUSC), AMC (Adaptive Modulation and Coding), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, the subcarriers may be divided into tiles including four contiguous physical subcarriers on three OFDM symbols. Each subchannel includes six tiles. Pilot is allocated to a corner of each tile. The O-PUSC is used only for uplink transmission, and each tile includes three continuous physical subcarriers on three OFDM symbols. Pilot is allocated to the center of tiles.

A resource allocation structure for performing HARQ and processing of information blocks will now be described.

Figure 3:
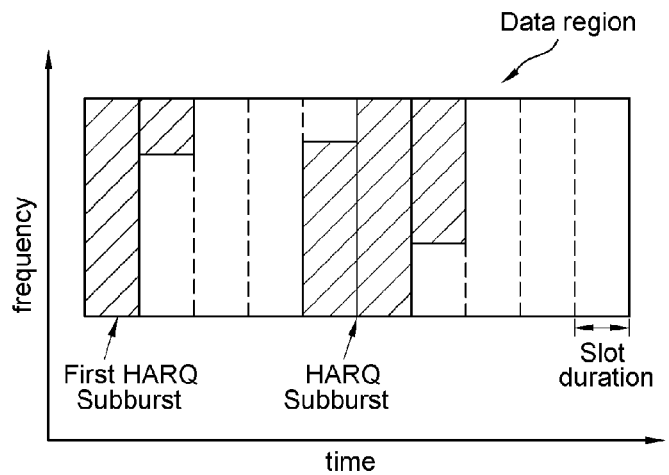
FIG. 3 is a graph showing a resource allocation structure for hybrid automatic repeat request (HARQ).

FIG. 3 is a graph showing a resource allocation structure for HARQ.

Referring to FIG. 3, a data region is a logical two-dimensional resource allocation region including at least one subchannel and at least one OFDM symbol. The data region may correspond to a single burst on a frame. In downlink transmission, information about the data region may be transmitted from a BS to a UE through an HARQ DL-MAP message. In uplink transmission, information about the data region may be transmitted from the BS to the UE through an HARQ UL-MAP message.

The data region is partitioned into at least one subburst according to the HARQ process with respect to each user. The HARQ process is performed on the single subburst with respect to a single information block. A single connection identifier (CID) may be allocated to the single subburst. The CID refers to a value for confirming a connection of the BS and the UE at a MAC. Every subburst belonging to a single data region operates in the same HARQ mode (chase combining or IR).

Each subburst is allocated by slot, and slots may be allocated in the frequency-first order. Namely, slots are allocated starting from one having the smallest OFDM symbol and smallest subchannel, while increasing the subchannels. The number of OFDM symbols is increased as much as a slot duration at the final subchannel.

One burst is allocated to a data stream using the HARQ process operating in the same mode, and each burst is divided into a subordinate concept such as sub-bursts by users (or CIDs).

Figure 4:
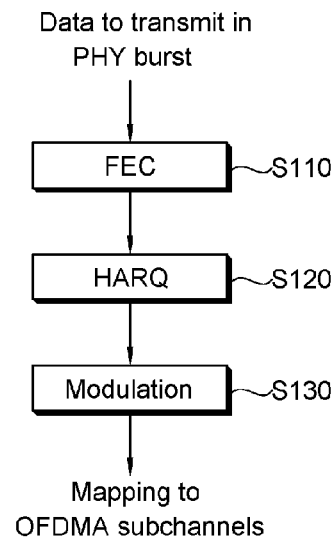
FIG. 4 is a flow chart illustrating the procedure of processing an information block to perform HARQ.

FIG. 4 is a flow chart illustrating the procedure of processing an information block to perform HARQ.

Referring to FIG. 4, FEC encoding is performed on data to be transmitted to a physical layer burst (S110). When a layer performing the HARQ is a physical layer, a data unit transmitted from a MAC layer, an upper layer, to the physical layer is called an information block. A CRC, an error detection code, is added to the information block, and the CRC-added information block turns coded bits through encoding. The coded bits outputted after being processed at a time by an encoder are called a mother codeword. As the encoding technique, a turbo code, one of error correction codes, may be applied. The turbo code is a systematic code including information bits as systematic bits. In case of a turbo code having a code rate of ⅓, two parity bits are allocated to a single systematic bit. The error correction code is not limited to the turbo code, and the technical idea of the present invention can be applicable as it is to a low density parity check code (LDPC), a convolution code, or the like.

The HARQ function is applied to the coded bits by an HARQ processor (S120). In order to retransmit erroneous packet (i.e., error-generated packet), the HARQ processor performs an HARQ mode (chase combining or IR), HARQ scheme (adaptive HARQ or non-adaptive HARQ) and a retransmission scheme (synchronous or asyn-chronous) of HARQ on the coded bits.

The HARQ function-applied coded bits are mixed in units of bits, which are then converted into data symbols (S130). Mixing the coded bits in units of bits is called interleaving, and transmission errors according to channels may be distributed through interleaving. The interleaved coded bits are converted into data symbols and mapped to subbursts of the data region.

Data retransmission of HARQ will now be described. Data retransmission of HARQ may be performed synchronously or asynchronously according to a stop and wait (SAW) scheme, a go-back-N (GBN) scheme, a selective repeat (SR) scheme.

Figure 5:
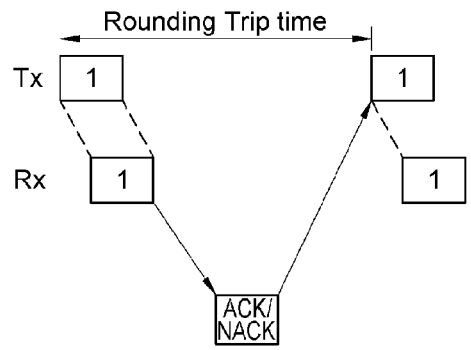
FIG. 5 illustrates data retransmission according to a stop and wait (SAW) scheme.

FIG. 5 illustrates data retransmission according to the SAW scheme.

Referring to FIG. 5, in the SAW scheme, a transmitter (Tx) transmits one frame, and after a rounding trip time (RTT) during which an ACK/NACK signal with respect to the transmitted frame is received from a receiver (Rx), the transmitter transmits a next frame or retransmission frame. When the transmitter receives a NACK signal in the non-adaptive HARQ of IR mode, it includes retransmission data incremental to the previously transmitted data in a retransmission frame and transmits the same. In this case, the transmitter may change a modulation scheme or radio resources to be applied to the retransmission data according to a determined rule, and apply the same to the re-transmission data.

In the SAW scheme, because transmission of the data frame is delayed during the RTT, a transmission efficiency may deteriorate.

Figure 6:
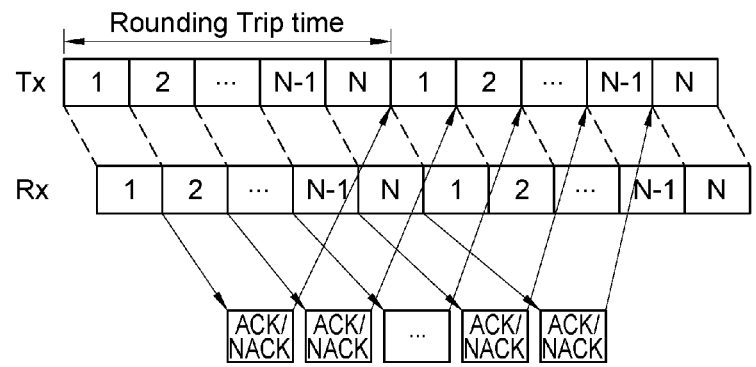
FIG. 6 illustrates data retransmission according to an N-channel SAW scheme.

FIG. 6 illustrates data retransmission according to an N-channel SAW scheme.

Referring to FIG. 6, in the N-channel SAW scheme, the transmitter (Tx) transmits one frame and performs independent SAW mode HARQ until when it receives an ACK/NACK signal from the receiver (Rx). Namely, in the N-channel SAW scheme, the transmitter transmits N number of frames during RTT, and the receiver separately transmits ACK/NACK signals with respect to each frame. In the non-adaptive HARQ of IR mode, the transmitter includes retransmission data incremental over the previously transmitted data in a retransmission frame with respect to the frame for which a NACK signal has been received from the receiver, and transmits the same. In this case, the transmitter may transmit the retransmission data by employing a modulation scheme and radio resources which are determined according to the number of transmissions of retransmission data.

The N-channel SAW scheme enhances a transmission efficiency by complementing the drawback of the SAW scheme in which data frames are not transmitted during the RTT.

Figure 7:
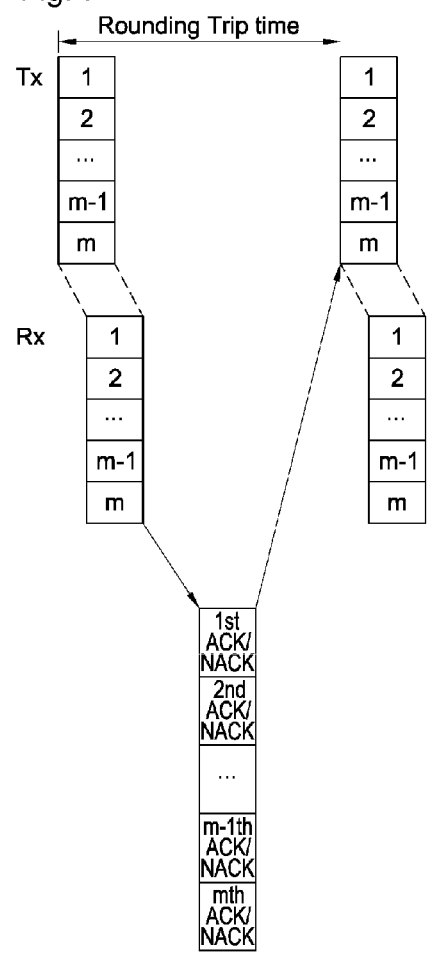
FIG. 7 illustrates data retransmission according to a multi-SAW scheme.

FIG. 7 illustrates data retransmission according to a multi-SAW scheme.

Referring to FIG. 7, if a bandwidth available for the wireless communication system is so wide or multiple antennas are in use, a plurality of HARQ processors may be performed in parallel to transmit several (m) number of transmission blocks on a single frame. The receiver may respond by m number of ACK/NACK signals with respect to the m number of transmission blocks included in the single frame. In the non-adaptive HARQ of IR mode, the transmitter includes retransmission data incremental over the previously transmitted data in a retransmission frame with respect to the frame for which a NACK signal has been received from the receiver, and transmits the same. In this case, the transmitter may transmit the retransmission data by employing a modulation scheme and radio resources determined according to the number of transmissions of retransmission data.

The transmission efficiency of the system can be further improved by employing the N-channel SAW scheme based on the multi-SAW scheme.

The non-adaptive HARQ of IR mode will now be described.

Figure 8:
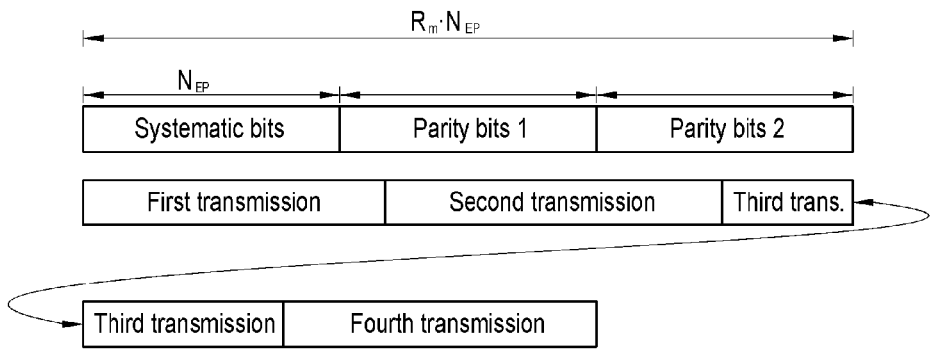
FIG. 8 illustrates an example of performing non-adaptive HARQ in an incremental redundancy (IR) mode.

FIG. 8 illustrates an example of performing the non-adaptive HARQ in an incremental redundancy (IR) mode, in which a modulation scheme and radio resources applied when initial data was transmitted is applied as it is to retransmission data.

Referring to FIG. 8, in the non-adaptive HARQ scheme of IR mode, retransmission data may be incrementally transmitted from the next of previously transmitted data. In the non-adaptive HARQ, the retransmission data is transmitted with the same size as the initial (i.e., first transmission) data. If an index of the retransmission data is the same as the length ($Rm \cdot N_{EP}$) of a mother codeword, retransmission data may be transmitted in a circulative manner. Rm is the reciprocal of a mother code rate 1/Rm, and $N_{EP}$ is the size of an information block included in an encoder. When the encoder uses a convolutional turbo code (CTC) of a double binary (i.e., duo-binary) structure, $N_{EP}$ is a parameter defined by the size of an encoded packet with the number of bits inputted to the CTC turbo encoder. When the size of an internal interleaver of the CTC turbo encoder is N, $N_{EP}=2 \times N$.

The mother codeword may include systematic bits having a bit stream with the same size as an information block inputted to the encoder and at least one parity bit, a bit stream related to the systematic bits. When the mother code rate is ⅓, the mother codeword includes one systematic bit and two parity bits. The mother codeword may be a turbo codeword. The length of the mother codeword is $R_m \cdot N_{EP}$.

In the IR mode, one portion of bit stream including the systematic bits of the mother codeword is transmitted as an initial transmission (first transmission block), and another portion of bit stream (second transmission block) are incrementally transmitted according to a retransmission request with respect to the mother codeword. The second transmission block is subsequent to the first transmission block. Namely, portions of bit streams of the mother codeword are transmitted in units of transmission blocks via the initial transmission and retransmission.

In the non-adaptive HARQ scheme of IR mode, the case where the retransmission data is transmitted with the same size as the initial data by applying the same modulation scheme and radio resources as the initial data is advantageous in that the bit streams can be successively transmitted without overlapping with a previously transmitted bit stream. Namely, because the initial data and the retransmission data have the same size, so a start point of a bit stream to be transmitted according to the number of transmissions can be accurately searched. Thus, the coding gain of the IR mode can be obtained at its maximum level. However, because the retransmission data is transmitted with the same size as the initial data, a large amount of radio resources are used, which, thus, is not effective in terms of scheduling efficiency of radio resources. In general, in the IR mode, retransmission data incrementally transmitted over the initial data can obtain a sufficient coding gain even if it has a smaller size than that of the initial data. In addition, in the non-adaptive HARQ scheme, because the same modulation scheme as that of the initial data is applied to the retransmission data without considering a channel state, the number of retransmissions increases in a poor channel environment, degrading the efficiency of data transmission.

A non-adaptive HARQ scheme of IR mode capable of obtaining a maximum coding gain of IR mode and enhancing the efficiency of data transmission will now be described.

Figure 9:
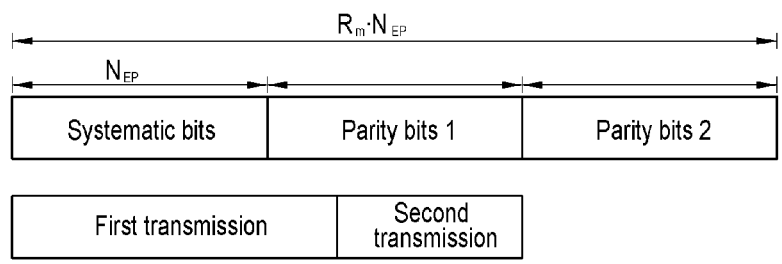
FIG. 9 illustrates an example of performing non-adaptive HARQ of IR mode according to an embodiment of the present invention.

FIG. 9 illustrates an example of performing non-adaptive HARQ of IR mode according to an embodiment of the present invention.

Referring to FIG. 9, after initial data is transmitted, retransmission data is transmitted according to a retransmission request. In this case, a modulation scheme applied for the transmission of the initial data is changed to transmit the retransmission data. Namely, an applied modulation scheme is changed according to the number of retransmissions, according to which retransmission data is transmitted. A smaller modulation order is applied according to the number of retransmissions to thus enhance the efficiency of data transmission. The size of retransmission data may be changed and transmitted according to the number of retransmissions. The proposed non-adaptive HARQ scheme of IR mode may be applicable to both the uplink and downlink data transmissions.

The downlink data transmission will now be described. It is assumed that modulation schemes supported in the non-adaptive HARQ scheme of IR mode are quadrature-phase shift keying (QPSK), 16 quadrature amplitude modulation (QAM), and 64 QAM. There is no limitation in the modulation schemes supported in the non-adaptive HARQ scheme of IR mode.

When the size of an information block ($N_{EP}$), the number of unit resources ($N_{SCH}$) and the number of symbols ($N_{sub}$) per unit resource are given, a modulation order (MOD) is determined by a value of a modulation order product code rate (MPR). The $N_{EP}$ may be the size of an information included in the encoder. The unit resource refers to a basic unit by which resources are allocated. It is assumed that the unit resource is a subchannel hereinafter, for the sake of brevity. When the unit resource is subchannel, $N_{SCH}$ refers to the number of subchannels, and $N_{sub}$ refers to the number of data sub-carriers included in a subchannel. A subchannel according to a PUSC permutation includes 48 data subcarriers, so $N_{sub}$ may be 48.

The MPR refers to a valid number of information bits transmitted on a single subcarrier. Namely, the MPR refers to a spectral efficiency. The MPR may be defined by Equation 1 shown below, and the range of the MPR value may be changed according to a type of a channel code or an arbitrary basis of the user.

Math Figure 1 [Math. 1]

$$MPR = \frac{N_{EP}}{N_{sub} \cdot N_{SCH}}$$

wherein if 0<MPR<1.5, QPSK with a modulation order 2 is used, if 1.5≦MPR<3.0, 16QAM with a modulation order 4 is used, and if 3.0≦MPR<5.4, 64QAM with a modulation order 6 is used. A valid code rate is a value obtained by dividing the MPR by modulation order.

In Equation 1, the range of MPR may be changed according to the number of retransmissions in order to change the modulation order with respect to retransmission data. The range of the MPR according to the number of retransmissions may be changed as follows.

If 0<MPR<QPSK_LIMIT+(αk+β), QPSK with a modulation order 2 is used, if QPSK_LIMIT+(αk+β)≦MPR<16 QAM_LIMIT+(αk+β), 16QAM with a modulation order 4 is used, and if 16 QAM_LIMIT+(αk+β)≦MPR<64 QAM_LIMIT+(αk+β), 64QAM with a modulation order 6 is used.

'k' is the number of retransmissions, and if k=0, it means an initial data transmission. (αk+β) is a linear offset adjusting the range of MPR, in which α is a first parameter that can considerably change a modulation order in proportion to the number of re-transmissions, and β is a second parameter that can minutely change a modulation order as a constant of a certain size. α and β may be 0 or a positive number or a negative number. The linear offset is adjusted by the first parameter that proportionally changes a modulation order according to the number of retransmissions or by the second parameter that changes a modulation order as a constant. QPSK_LIMIT, 16 QAM_LIMIT and 64 QAM_LIMIT are range values of MPR. QPSK_LIMIT is an upper limit value of the MPR range transmitted in QPSK at the initial transmission (k=0) without retransmission. 16 QAM_LIMIT is an upper limit value of the MPR range transmitted in 16QAM at the initial transmission (k=0) without retransmission. 64 QAM_LIMIT is an upper limit value of the MPR range transmitted in 64 QAM at the initial transmission (k=0) without retransmission. The QPSK_LIMIT, 16 QAM_LIMIT and 64 QAM_LIMIT may be determined according to types of channel codes or an arbitrary basis of the user.

The MPR range according to the number of retransmissions may be changed as follows:

As for the MPR value in Equation 1, if MPR−(αk+β) <QPSK_LIMIT, QPSK with a modulation order 2 is used, if QPSK_LIMIT≦MPR−(αk+β)<16 QAM_LIMIT, 16QAM with a modulation order 4 is used, and if 16 QAM_LIMIT≦MPR−(αk+β)<64 QAM_LIMIT, 64QAM with a modulation order 6 is used.

The range of MPR may vary and the modulation order may change according to 'k', and a change degree of the modulation order may be adjusted according to α and β. For example, it is assumed that $N_{EP}$=144, $N_{SCH}$=1, α=1.5, β=0, QPSK_LIMIT=1.5, and 16 QAM_LIMIT=3.0. MR=3.0, and 64QAM with a modulation order 6 is used at a first transmission (k=0), 16QAM with a modulation order 4 is used at a second transmission (k=1), and QPSK with a modulation order 2 is used at a third transmission (k=3). The modulation orders are reduced according to the number of re-transmissions. That is, the basis for obtaining a modulation order used for the initial data and that for obtaining a modulation order used for retransmission data change according to the number of transmissions. A modulation order obtained according to the basis of the MPR that changes according to the number of transmissions is applied to the retransmission data.

The values α and β may be determined according to an arbitrary basis. Only the value α may be used according to circumstances, and in this case, the value β is 0. The values α and β may be determined in consideration of a channel state or a maximum number of retransmissions. If the channel environment is good, if the maximum number of retransmissions is small, or if the length of a transmitted information block is quite smaller than that of a codeword, the values α and β may be determined to be smaller than 1 to make a change degree of the modulation orders smaller in retransmissions. Conversely, if most parity bits are transmitted at the initial transmission, the MPR has lower importance, so the lowest modulation order may be used by applying a large α value. In other words, the case where most parity bits have been transmitted at the initial data transmission but retransmission is required to be performed means that a channel state is not very good, so retransmission data needs to be transmitted by using QPSK, the lowest modulation order. If a data processing rate of the system is low, it is important to make retransmission of data take place as less as possible, so the values α and β may be adjusted to make data transmission performed with a lower modulation order. If the data processing rate of the system is so high that re-transmission of data does not much affect the performance of the system, the values α and β may be adjusted to make data transmission performed with a higher modulation order.

The information about α and β may be provided by a BS to a UE through control channel. The BS may transmit the values α and β through a broadcast channel that can be received by every UE. Or, the BS may transmit the values α and β through a multicast channel that can be received by a particular UE group or a unicast channel that can be received by a particular UE.

Meanwhile, in order to lower the modulation order according to the number of re-transmissions, modulation orders according to the number of retransmissions may be previously designated to be used. For example, it may be designated such that if 64 QAM is used at the first transmission, QPSK is used at the second transmission.

Table 1 below shows the number of subchannels ($N_{SCH}$) according to $N_{EP}$, MPRs, modulation orders, and code rates in downlink. 'Sch' is the number of subchannels, and 'Rate' is code rate.

TABLE 1

| $N_{EP}$ | 144 | 192 | 288 | 384 | 480 | 960 | 1920 | 2880 | 3840 | 4800 |
|---|---|---|---|---|---|---|---|---|---|---|
| Sch | 1.00 | 1.00 | | | | | | | | |
| MPR | 3.00 | 4.00 | | | | | | | | |
| MOD | 6.00 | 6.00 | | | | | | | | |
| Rate | 1/2 | 2/3 | | | | | | | | |

TABLE 1-continued

| $N_{EP}$ | 144 | 192 | 288 | 384 | 480 | 960 | 1920 | 2880 | 3840 | 4800 |
|---|---|---|---|---|---|---|---|---|---|---|
| Rate | 0.50 | 0.67 | | | | | | | | |
| Sch | 2.00 | 2.00 | 2.00 | 2.00 | 2.00 | | | | | |
| MPR | 1.50 | 2.00 | 3.00 | 4.00 | 5.00 | | | | | |
| MOD | 4.00 | 4.00 | 6.00 | 6.00 | 6.00 | | | | | |
| Rate | 3/8 | 1/2 | 1/2 | 2/3 | 5/6 | | | | | |
| Rate | 0.38 | 0.50 | 0.50 | 0.67 | 0.83 | | | | | |
| Sch | 3.00 | 3.00 | 3.00 | 3.00 | 3.00 | | | | | |
| MPR | 1.00 | 1.33 | 2.00 | 2.67 | 3.33 | | | | | |
| MOD | 2.00 | 2.00 | 4.00 | 4.00 | 6.00 | | | | | |
| Rate | 1/2 | 2/3 | 1/2 | 2/3 | 5/9 | | | | | |
| Rate | 0.50 | 0.67 | 0.50 | 0.67 | 0.56 | | | | | |
| Sch | | 4.00 | 4.00 | 4.00 | 4.00 | 4.00 | | | | |
| MPR | | 1.00 | 1.50 | 2.00 | 2.50 | 5.00 | | | | |
| MOD | | 2.00 | 4.00 | 4.00 | 4.00 | 6.00 | | | | |
| Rate | | 1/2 | 3/8 | 1/2 | 5/8 | 5/6 | | | | |
| Rate | | 0.50 | 0.38 | 0.50 | 0.63 | 0.83 | | | | |
| Sch | 5.00 | | 5.00 | 5.00 | 5.00 | 5.00 | | | | |
| MPR | 0.60 | | 1.20 | 1.60 | 2.00 | 4.00 | | | | |
| MOD | 2.00 | | 2.00 | 4.00 | 4.00 | 6.00 | | | | |
| Rate | 3/10 | | 3/5 | 2/5 | 1/2 | 2/3 | | | | |
| Rate | 0.30 | | 0.60 | 0.40 | 0.50 | 0.67 | | | | |
| Sch | 6.00 | 6.00 | 6.00 | 6.00 | 6.00 | 6.00 | | | | |
| MPR | 0.50 | 0.67 | 1.00 | 1.33 | 1.67 | 3.33 | | | | |
| MOD | 2.00 | 2.00 | 2.00 | 2.00 | 4.00 | 6.00 | | | | |
| Rate | 1/4 | 1/3 | 1/2 | 2/3 | 5/12 | 5/9 | | | | |
| Rate | 0.25 | 0.33 | 0.50 | 0.67 | 0.42 | 0.56 | | | | |
| Sch | | 8.00 | | 8.00 | 8.00 | 8.00 | 8.00 | | | |
| MPR | | 0.50 | | 1.00 | 1.25 | 2.50 | 5.00 | | | |
| MOD | | 2.00 | | 2.00 | 2.00 | 4.00 | 6.00 | | | |
| Rate | | 1/4 | | 1/2 | 5/8 | 5/8 | 5/6 | | | |
| Rate | | 0.25 | | 0.50 | 0.63 | 0.63 | 0.83 | | | |
| Sch | 9.00 | | 9.00 | | | | 9.00 | | | |
| MPR | 0.33 | | 0.67 | | | | 4.44 | | | |
| MOD | 2.00 | | 2.00 | | | | 6.00 | | | |
| Rate | 1/6 | | 1/3 | | | | 20/27 | | | |
| Rate | 0.17 | | 0.33 | | | | 0.74 | | | |
| Sch | | | | | 10.00 | 10.00 | 10.00 | | | |
| MPR | | | | | 1.00 | 2.00 | 4.00 | | | |
| MOD | | | | | 2.00 | 4.00 | 6.00 | | | |
| Rate | | | | | 1/2 | 1/2 | 2/3 | | | |
| Rate | | | | | 0.50 | 0.50 | 0.67 | | | |
| Sch | 12.00 | 12.00 | 12.00 | 12.00 | | | | 12.00 | | |
| MPR | 0.25 | 0.33 | 0.50 | 0.67 | | | | 5.00 | | |
| MOD | 2.00 | 2.00 | 2.00 | 2.00 | | | | 6.00 | | |
| Rate | 1/8 | 1/6 | 1/4 | 1/3 | | | | 5/6 | | |
| Rate | 0.13 | 0.17 | 0.25 | 0.33 | | | | 0.83 | | |
| Sch | | | | | | 13.00 | 13.00 | 13.00 | | |
| MPR | | | | | | 1.54 | 3.08 | 4.62 | | |
| MOD | | | | | | 4.00 | 6.00 | 6.00 | | |
| Rate | | | | | | 5/13 | 20/39 | 10/13 | | |
| Rate | | | | | | 0.38 | 0.51 | 0.77 | | |
| Sch | | | | | 15.00 | 15.00 | 15.00 | 15.00 | | |
| MPR | | | | | 0.67 | 1.33 | 2.67 | 4.00 | | |
| MOD | | | | | 2.00 | 2.00 | 4.00 | 6.00 | | |
| Rate | | | | | 1/3 | 2/3 | 2/3 | 2/3 | | |
| Rate | | | | | 0.33 | 0.67 | 0.67 | 0.67 | | |
| Sch | | 16.00 | | 16.00 | | | | | 16.00 | |
| MPR | | 0.25 | | 0.50 | | | | | 5.00 | |
| MOD | | 2.00 | | 2.00 | | | | | 6.00 | |
| Rate | | 1/8 | | 1/4 | | | | | 5/6 | |
| Rate | | 0.13 | | 0.25 | | | | | 0.83 | |
| Sch | 18.00 | | 18.00 | | | | | | 18.00 | |
| MPR | 0.17 | | 0.33 | | | | | | 4.44 | |
| MOD | 2.00 | | 2.00 | | | | | | 6.00 | |
| Rate | 1/12 | | 1/6 | | | | | | 20/27 | |
| Rate | 0.08 | | 0.17 | | | | | | 0.74 | |
| Sch | | | | | 20.00 | 20.00 | 20.00 | 20.00 | 20.00 | 20.00 |
| MPR | | | | | 0.50 | 1.00 | 2.00 | 3.00 | 4.00 | 5.00 |
| MOD | | | | | 2.00 | 2.00 | 4.00 | 6.00 | 6.00 | 6.00 |
| Rate | | | | | 1/4 | 1/2 | 1/2 | 1/2 | 2/3 | 5/6 |
| Rate | | | | | 0.25 | 0.50 | 0.50 | 0.50 | 0.67 | 0.83 |
| Sch | | | | | | | | 22.00 | | 22.00 |
| MPR | | | | | | | | 2.73 | | 4.55 |
| MOD | | | | | | | | 4.00 | | 6.00 |
| Rate | | | | | | | | 15/22 | | 25/33 |

TABLE 1-continued

| $N_{EP}$ | 144 | 192 | 288 | 384 | 480 | 960 | 1920 | 2880 | 3840 | 4800 |
|---|---|---|---|---|---|---|---|---|---|---|
| Rate | | | | | | | 0.68 | | 0.76 | |
| Sch | | 24.00 | 24.00 | 24.00 | | | | | | |
| MPR | | 0.17 | 0.25 | 0.33 | | | | | | |
| MOD | | 2.00 | 2.00 | 2.00 | | | | | | |
| Rate | | 1/2 | 1/8 | 1/6 | | | | | | |
| Rate | | 0.08 | 0.13 | 0.17 | | | | | | |
| Sch | | | | | | | 26.00 | | 26.00 | 26.00 |
| MPR | | | | | | | 1.54 | | 3.08 | 3.85 |
| MOD | | | | | | | 4.00 | | 6.00 | 6.00 |
| Rate | | | | | | | 5/13 | | 20/39 | 25/39 |
| Rate | | | | | | | 0.38 | | 0.51 | 0.64 |
| Sch | | | | | 30.00 | 30.00 | 30.00 | 30.00 | 30.00 | |
| MPR | | | | | 0.33 | 0.67 | 1.33 | 2.00 | 2.67 | |
| MOD | | | | | 2.00 | 2.00 | 2.00 | 4.00 | 4.00 | |
| Rate | | | | | 1/6 | 1/3 | 2/3 | 1/2 | 2/3 | |
| Rate | | | | | 0.17 | 0.33 | 0.67 | 0.50 | 0.67 | |
| Sch | | | | 32.00 | | | | | | 32.00 |
| MPR | | | | 0.25 | | | | | | 3.13 |
| MOD | | | | 2.00 | | | | | | 6.00 |
| Rate | | | | 1/8 | | | | | | 25/48 |
| Rate | | | | 0.13 | | | | | | 0.52 |
| Sch | | | 36.00 | | | | | | | |
| MPR | | | 0.17 | | | | | | | |
| MOD | | | 2.00 | | | | | | | |
| Rate | | | 1/12 | | | | | | | |
| Rate | | | 0.08 | | | | | | | |
| Sch | | | | | | | | | | 38.00 |
| MPR | | | | | | | | | | 2.63 |
| MOD | | | | | | | | | | 4.00 |
| Rate | | | | | | | | | | 25/38 |
| Rate | | | | | | | | | | 0.66 |
| Sch | | | | | 40.00 | 40.00 | 40.00 | 40.00 | 40.00 | |
| MPR | | | | | 0.25 | 0.50 | 1.00 | 1.50 | 2.00 | |
| MOD | | | | | 2.00 | 2.00 | 2.00 | 4.00 | 4.00 | |
| Rate | | | | | 1/8 | 1/4 | 1/2 | 3/8 | 1/2 | |
| Rate | | | | | 0.13 | 0.25 | 0.50 | 0.38 | 0.50 | |
| Sch | | | | | | | | 44.00 | | |
| MPR | | | | | | | | 1.36 | | |
| MOD | | | | | | | | 2.00 | | |
| Rate | | | | | | | | 15/22 | | |
| Rate | | | | | | | | 0.68 | | |
| Sch | | | | 48.00 | | | | | | |
| MPR | | | | 0.17 | | | | | | |
| MOD | | | | 2.00 | | | | | | |
| Rate | | | | 1/12 | | | | | | |
| Rate | | | | 0.08 | | | | | | |
| Sch | | | | | | | | | 50.00 | |
| MPR | | | | | | | | | 2.00 | |
| MOD | | | | | | | | | 4.00 | |
| Rate | | | | | | | | | 1/2 | |
| Rate | | | | | | | | | 0.50 | |
| Sch | | | | | | | | 52.00 | | |
| MPR | | | | | | | | 1.54 | | |
| MOD | | | | | | | | 4.00 | | |
| Rate | | | | | | | | 5/13 | | |
| Rate | | | | | | | | 0.38 | | |
| Sch | | | | | 60.00 | 60.00 | 60.00 | 60.00 | 60.00 | |
| MPR | | | | | 0.17 | 0.33 | 0.67 | 1.00 | 1.33 | |
| MOD | | | | | 2.00 | 2.00 | 2.00 | 2.00 | 2.00 | |
| Rate | | | | | 1/12 | 1/6 | 1/3 | 1/2 | 2/3 | |
| Rate | | | | | 0.08 | 0.17 | 0.33 | 0.50 | 0.67 | |
| Sch | | | | | | | | | | 64.00 |
| MPR | | | | | | | | | | 1.56 |
| MOD | | | | | | | | | | 4.00 |
| Rate | | | | | | | | | | 25/64 |
| Rate | | | | | | | | | | 0.39 |
| Sch | | | | | | | | | | 76.00 |
| MPR | | | | | | | | | | 1.32 |
| MOD | | | | | | | | | | 2.00 |
| Rate | | | | | | | | | | 25/38 |
| Rate | | | | | | | | | | 0.66 |
| Sch | | | | | | | 80.00 | 80.00 | 80.00 | |
| MPR | | | | | | | 0.25 | 0.50 | 1.00 | |

TABLE 1-continued

| $N_{EP}$ | 144 | 192 | 288 | 384 | 480 | 960 | 1920 | 2880 | 3840 | 4800 |
|---|---|---|---|---|---|---|---|---|---|---|
| MOD |  |  |  |  |  | 2.00 | 2.00 |  | 2.00 |  |
| Rate |  |  |  |  |  | 1/8 | 1/4 |  | 1/2 |  |
| Rate |  |  |  |  |  | 0.13 | 0.25 |  | 0.50 |  |
| Sch |  |  |  |  |  |  |  | 90.00 |  |  |
| MPR |  |  |  |  |  |  |  | 0.67 |  |  |
| MOD |  |  |  |  |  |  |  | 2.00 |  |  |
| Rate |  |  |  |  |  |  |  | 1/3 |  |  |
| Rate |  |  |  |  |  |  |  | 0.33 |  |  |
| Sch |  |  |  |  |  |  |  |  |  | 100.00 |
| MPR |  |  |  |  |  |  |  |  |  | 1.00 |
| MOD |  |  |  |  |  |  |  |  |  | 2.00 |
| Rate |  |  |  |  |  |  |  |  |  | 1/2 |
| Rate |  |  |  |  |  |  |  |  |  | 0.50 |
| Sch |  |  |  |  |  | 120.00 | 120.00 | 120.00 | 120.00 |  |
| MPR |  |  |  |  |  | 0.17 | 0.33 | 0.50 | 0.67 |  |
| MOD |  |  |  |  |  | 2.00 | 2.00 | 2.00 | 2.00 |  |
| Rate |  |  |  |  |  | 1/12 | 1/6 | 1/4 | 1/3 |  |
| Rate |  |  |  |  |  | 0.08 | 0.17 | 0.25 | 0.33 |  |
| Sch |  |  |  |  |  |  |  |  |  | 150.00 |
| MPR |  |  |  |  |  |  |  |  |  | 0.67 |
| MOD |  |  |  |  |  |  |  |  |  | 2.00 |
| Rate |  |  |  |  |  |  |  |  |  | 1/3 |
| Rate |  |  |  |  |  |  |  |  |  | 0.33 |
| Sch |  |  |  |  |  |  | 160.00 |  | 160.00 |  |
| MPR |  |  |  |  |  |  | 0.25 |  | 0.50 |  |
| MOD |  |  |  |  |  |  | 2.00 |  | 2.00 |  |
| Rate |  |  |  |  |  |  | 1/8 |  | 1/4 |  |
| Rate |  |  |  |  |  |  | 0.13 |  | 0.25 |  |
| Sch |  |  |  |  |  |  |  | 180.00 |  |  |
| MPR |  |  |  |  |  |  |  | 0.33 |  |  |
| MOD |  |  |  |  |  |  |  | 2.00 |  |  |
| Rate |  |  |  |  |  |  |  | 1/6 |  |  |
| Rate |  |  |  |  |  |  |  | 0.17 |  |  |
| Sch |  |  |  |  |  |  |  |  |  | 200.00 |
| MPR |  |  |  |  |  |  |  |  |  | 0.50 |
| MOD |  |  |  |  |  |  |  |  |  | 2.00 |
| Rate |  |  |  |  |  |  |  |  |  | 1/4 |
| Rate |  |  |  |  |  |  |  |  |  | 0.25 |
| Sch |  |  |  |  |  |  | 240.00 | 240.00 | 240.00 |  |
| MPR |  |  |  |  |  |  | 0.17 | 0.25 | 0.33 |  |
| MOD |  |  |  |  |  |  | 2.00 | 2.00 | 2.00 |  |
| Rate |  |  |  |  |  |  | 1/12 | 1/8 | 1/6 |  |
| Rate |  |  |  |  |  |  | 0.08 | 0.13 | 0.17 |  |
| Sch |  |  |  |  |  |  |  |  |  | 300.00 |
| MPR |  |  |  |  |  |  |  |  |  | 0.33 |
| MOD |  |  |  |  |  |  |  |  |  | 2.00 |
| Rate |  |  |  |  |  |  |  |  |  | 1/6 |
| Rate |  |  |  |  |  |  |  |  |  | 0.17 |
| Sch |  |  |  |  |  |  |  |  | 320.00 |  |
| MPR |  |  |  |  |  |  |  |  | 0.25 |  |
| MOD |  |  |  |  |  |  |  |  | 2.00 |  |
| Rate |  |  |  |  |  |  |  |  | 1/8 |  |
| Rate |  |  |  |  |  |  |  |  | 0.13 |  |
| Sch |  |  |  |  |  |  |  | 360.00 |  |  |
| MPR |  |  |  |  |  |  |  | 0.17 |  |  |
| MOD |  |  |  |  |  |  |  | 2.00 |  |  |
| Rate |  |  |  |  |  |  |  | 1/12 |  |  |
| Rate |  |  |  |  |  |  |  | 0.08 |  |  |
| Sch |  |  |  |  |  |  |  |  |  | 400.00 |
| MPR |  |  |  |  |  |  |  |  |  | 0.25 |
| MOD |  |  |  |  |  |  |  |  |  | 2.00 |
| Rate |  |  |  |  |  |  |  |  |  | 1/8 |
| Rate |  |  |  |  |  |  |  |  |  | 0.13 |
| Sch |  |  |  |  |  |  |  |  | 480.00 |  |
| MPR |  |  |  |  |  |  |  |  | 0.17 |  |
| MOD |  |  |  |  |  |  |  |  | 2.00 |  |
| Rate |  |  |  |  |  |  |  |  | 1/12 |  |
| Rate |  |  |  |  |  |  |  |  | 0.08 |  |

The modulation order may be differently applied according to the number of sub-channels (Sch) with the same $N_{EP}$. Various modulation schemes may be applied depending on the number of subchannels with the same $N_{EP}$. For example, when $N_{EP}$ is 144, the 64 QAM modulation scheme having an modulation order 6 is used if the number of subchannel is 1, the 16 QAM modulation scheme with a modulation order 4 is used if the number of subchannels is 2, and the QPSK modulation scheme with a modulation order 2 is used if the number of subchannels is 3 or larger.

Table 2 below shows an example in which the modulation orders are lowered according to the number (k) of retransmissions for each $N_{EP}$. In Equation 1, $\alpha=1.5$, $\beta=0$, QPSK_LIMIT=1.5, 16 QAM_LIMIT=3.0, 64 QAM_LIMIT=5.4. M is modulation order, and L is the number of bits of a transmission block.

TABLE 2

| | | | \multicolumn{8}{c}{k} | | | | | | | |
|---|---|---|---|---|---|---|---|---|---|---|
| | | | 0 | | 1 | | 2 | | 3 | |
| $N_{EP}$ | SCH | MPR | M | L | M | L | M | L | M | L |
| 144 | 1 | 3.00 | 6 | 288 | 4 | 192 | 2 | 96 | 2 | 96 |
| | 2 | 1.50 | 4 | 384 | 2 | 192 | 2 | 192 | 2 | 192 |
| | 3 | 1.00 | 2 | 288 | 2 | 288 | 2 | 288 | 2 | 288 |
| | 5 | 0.60 | 2 | 480 | 2 | 480 | 2 | 480 | 2 | 480 |
| | 6 | 0.50 | 2 | 576 | 2 | 576 | 2 | 576 | 2 | 576 |
| | 9 | 0.33 | 2 | 864 | 2 | 864 | 2 | 864 | 2 | 864 |
| | 12 | 0.25 | 2 | 1152 | 2 | 1152 | 2 | 1152 | 2 | 1152 |
| | 18 | 0.17 | 2 | 1728 | 2 | 1728 | 2 | 1728 | 2 | 1728 |
| 192 | 1 | 4.00 | 6 | 288 | 4 | 192 | 2 | 96 | 2 | 96 |
| | 2 | 2.00 | 4 | 384 | 2 | 192 | 2 | 192 | 2 | 192 |
| | 3 | 1.33 | 2 | 288 | 2 | 288 | 2 | 288 | 2 | 288 |
| | 4 | 1.00 | 2 | 384 | 2 | 384 | 2 | 384 | 2 | 384 |
| | 6 | 0.67 | 2 | 576 | 2 | 576 | 2 | 576 | 2 | 576 |
| | 8 | 0.50 | 2 | 768 | 2 | 768 | 2 | 768 | 2 | 768 |
| | 12 | 0.33 | 2 | 1152 | 2 | 1152 | 2 | 1152 | 2 | 1152 |
| | 16 | 0.25 | 2 | 1536 | 2 | 1536 | 2 | 1536 | 2 | 1536 |
| | 24 | 0.17 | 2 | 2304 | 2 | 2304 | 2 | 2304 | 2 | 2304 |
| 288 | 2 | 3 | 6 | 576 | 4 | 384 | 2 | 192 | 2 | 192 |
| | 3 | 2 | 4 | 576 | 2 | 288 | 2 | 288 | 2 | 288 |
| | 4 | 1.5 | 4 | 768 | 2 | 384 | 2 | 384 | 2 | 384 |
| | 5 | 1.2 | 2 | 480 | 2 | 480 | 2 | 480 | 2 | 480 |
| | 6 | 1 | 2 | 576 | 2 | 576 | 2 | 576 | 2 | 576 |
| | 9 | 0.67 | 2 | 864 | 2 | 864 | 2 | 864 | 2 | 864 |
| | 12 | 0.5 | 2 | 1152 | 2 | 1152 | 2 | 1152 | 2 | 1152 |
| | 18 | 0.33 | 2 | 1728 | 2 | 1728 | 2 | 1728 | 2 | 1728 |
| | 24 | 0.25 | 2 | 2304 | 2 | 2304 | 2 | 2304 | 2 | 2304 |
| | 36 | 0.17 | 2 | 3456 | 2 | 3456 | 2 | 3456 | 2 | 3456 |
| 384 | 2 | 4.00 | 6 | 576 | 4 | 384 | 2 | 192 | 2 | 192 |
| | 3 | 2.67 | 4 | 576 | 2 | 288 | 2 | 288 | 2 | 288 |
| | 4 | 2.00 | 4 | 768 | 2 | 384 | 2 | 384 | 2 | 384 |
| | 5 | 1.60 | 4 | 960 | 2 | 480 | 2 | 480 | 2 | 480 |
| | 6 | 1.33 | 2 | 576 | 2 | 576 | 2 | 576 | 2 | 576 |
| | 8 | 1.00 | 2 | 768 | 2 | 768 | 2 | 768 | 2 | 768 |
| | 12 | 0.67 | 2 | 1152 | 2 | 1152 | 2 | 1152 | 2 | 1152 |
| | 16 | 0.50 | 2 | 1536 | 2 | 1536 | 2 | 1536 | 2 | 1536 |
| | 24 | 0.33 | 2 | 2304 | 2 | 2304 | 2 | 2304 | 2 | 2304 |
| | 32 | 0.25 | 2 | 3072 | 2 | 3072 | 2 | 3072 | 2 | 3072 |
| | 48 | 0.17 | 2 | 4608 | 2 | 4608 | 2 | 4608 | 2 | 4608 |
| 480 | 2 | 5.00 | 6 | 576 | 6 | 576 | 4 | 384 | 2 | 192 |
| | 3 | 3.33 | 6 | 864 | 4 | 576 | 2 | 288 | 2 | 288 |
| | 4 | 2.50 | 4 | 768 | 2 | 384 | 2 | 384 | 2 | 384 |
| | 5 | 2.00 | 4 | 960 | 2 | 480 | 2 | 480 | 2 | 480 |
| | 6 | 1.67 | 4 | 1152 | 2 | 576 | 2 | 576 | 2 | 576 |
| | 8 | 1.25 | 2 | 768 | 2 | 768 | 2 | 768 | 2 | 768 |
| | 10 | 1.00 | 2 | 960 | 2 | 960 | 2 | 960 | 2 | 960 |
| | 15 | 0.67 | 2 | 1440 | 2 | 1440 | 2 | 1440 | 2 | 1440 |
| | 20 | 0.50 | 2 | 1920 | 2 | 1920 | 2 | 1920 | 2 | 1920 |
| | 30 | 0.33 | 2 | 2880 | 2 | 2880 | 2 | 2880 | 2 | 2880 |
| | 40 | 0.25 | 2 | 3840 | 2 | 3840 | 2 | 3840 | 2 | 3840 |
| | 60 | 0.17 | 2 | 5760 | 2 | 5760 | 2 | 5760 | 2 | 5760 |
| 960 | 4 | 5.00 | 6 | 1152 | 6 | 1152 | 4 | 768 | 2 | 384 |
| | 5 | 4.00 | 6 | 1440 | 4 | 960 | 2 | 480 | 2 | 480 |
| | 6 | 3.33 | 6 | 1728 | 4 | 1152 | 2 | 576 | 2 | 576 |
| | 8 | 2.50 | 4 | 1536 | 2 | 768 | 2 | 768 | 2 | 768 |
| | 10 | 2.00 | 4 | 1920 | 2 | 960 | 2 | 960 | 2 | 960 |
| | 13 | 1.54 | 4 | 2496 | 2 | 1248 | 2 | 1248 | 2 | 1248 |
| | 15 | 1.33 | 2 | 1440 | 2 | 1440 | 2 | 1440 | 2 | 1440 |
| | 20 | 1.00 | 2 | 1920 | 2 | 1920 | 2 | 1920 | 2 | 1920 |
| | 30 | 0.67 | 2 | 2880 | 2 | 2880 | 2 | 2880 | 2 | 2880 |
| | 40 | 0.50 | 2 | 3840 | 2 | 3840 | 2 | 3840 | 2 | 3840 |
| | 60 | 0.33 | 2 | 5760 | 2 | 5760 | 2 | 5760 | 2 | 5760 |
| | 80 | 0.25 | 2 | 7680 | 2 | 7680 | 2 | 7680 | 2 | 7680 |
| | 120 | 0.17 | 2 | 11520 | 2 | 11520 | 2 | 11520 | 2 | 11520 |
| 1920 | 8 | 5.00 | 6 | 2304 | 6 | 2304 | 4 | 1536 | 2 | 768 |
| | 9 | 4.44 | 6 | 2592 | 4 | 1728 | 2 | 864 | 2 | 864 |
| | 10 | 4.00 | 6 | 2880 | 4 | 1920 | 2 | 960 | 2 | 960 |
| | 13 | 3.08 | 6 | 3744 | 4 | 2496 | 2 | 1248 | 2 | 1248 |
| | 15 | 2.67 | 4 | 2880 | 2 | 1440 | 2 | 1440 | 2 | 1440 |
| | 20 | 2.00 | 4 | 3840 | 2 | 1920 | 2 | 1920 | 2 | 1920 |
| | 26 | 1.54 | 4 | 4992 | 2 | 2496 | 2 | 2496 | 2 | 2496 |

TABLE 2-continued

| $N_{EP}$ | SCH | MPR | k=0 M | k=0 L | k=1 M | k=1 L | k=2 M | k=2 L | k=3 M | k=3 L |
|---|---|---|---|---|---|---|---|---|---|---|
|  | 30 | 1.33 | 2 | 2880 | 2 | 2880 | 2 | 2880 | 2 | 2880 |
|  | 40 | 1.00 | 2 | 3840 | 2 | 3840 | 2 | 3840 | 2 | 3840 |
|  | 60 | 0.67 | 2 | 5760 | 2 | 5760 | 2 | 5760 | 2 | 5760 |
|  | 80 | 0.50 | 2 | 7680 | 2 | 7680 | 2 | 7680 | 2 | 7680 |
|  | 120 | 0.33 | 2 | 11520 | 2 | 11520 | 2 | 11520 | 2 | 11520 |
|  | 160 | 0.25 | 2 | 15360 | 2 | 15360 | 2 | 15360 | 2 | 15360 |
|  | 240 | 0.17 | 2 | 23040 | 2 | 23040 | 2 | 23040 | 2 | 23040 |
| 2880 | 12 | 5.00 | 6 | 3456 | 6 | 3456 | 4 | 2304 | 2 | 1152 |
|  | 13 | 4.62 | 6 | 3744 | 6 | 3744 | 4 | 2496 | 2 | 1248 |
|  | 15 | 4.00 | 6 | 4320 | 4 | 2880 | 2 | 1440 | 2 | 1440 |
|  | 20 | 3.00 | 6 | 5760 | 4 | 3840 | 2 | 1920 | 2 | 1920 |
|  | 22 | 2.73 | 4 | 4224 | 2 | 2112 | 2 | 2112 | 2 | 2112 |
|  | 30 | 2.00 | 4 | 5760 | 2 | 2880 | 2 | 2880 | 2 | 2880 |
|  | 40 | 1.50 | 4 | 7680 | 2 | 3840 | 2 | 3840 | 2 | 3840 |
|  | 44 | 1.36 | 2 | 4224 | 2 | 4224 | 2 | 4224 | 2 | 4224 |
|  | 60 | 1.00 | 2 | 5760 | 2 | 5760 | 2 | 5760 | 2 | 5760 |
|  | 90 | 0.67 | 2 | 8640 | 2 | 8640 | 2 | 8640 | 2 | 8640 |
|  | 120 | 0.50 | 2 | 11520 | 2 | 11520 | 2 | 11520 | 2 | 11520 |
|  | 180 | 0.33 | 2 | 17280 | 2 | 17280 | 2 | 17280 | 2 | 17280 |
|  | 240 | 0.25 | 2 | 23040 | 2 | 23040 | 2 | 23040 | 2 | 23040 |
|  | 360 | 0.17 | 2 | 34560 | 2 | 34560 | 2 | 34560 | 2 | 34560 |
| 3840 | 16 | 5.00 | 6 | 4608 | 6 | 4608 | 4 | 3072 | 2 | 1536 |
|  | 18 | 4.44 | 6 | 5184 | 4 | 3456 | 2 | 1728 | 2 | 1728 |
|  | 20 | 4.00 | 6 | 5760 | 4 | 3840 | 2 | 1920 | 2 | 1920 |
|  | 26 | 3.08 | 6 | 7488 | 4 | 4992 | 2 | 2496 | 2 | 2496 |
|  | 30 | 2.67 | 4 | 5760 | 2 | 2880 | 2 | 2880 | 2 | 2880 |
|  | 40 | 2.00 | 4 | 7680 | 2 | 3840 | 2 | 3840 | 2 | 3840 |
|  | 44 | 1.82 | 4 | 8448 | 2 | 4224 | 2 | 4224 | 2 | 4224 |
|  | 52 | 1.54 | 4 | 9984 | 2 | 4992 | 2 | 4992 | 2 | 4992 |
|  | 60 | 1.33 | 2 | 5760 | 2 | 5760 | 2 | 5760 | 2 | 5760 |
|  | 80 | 1.00 | 2 | 7680 | 2 | 7680 | 2 | 7680 | 2 | 7680 |
|  | 120 | 0.67 | 2 | 11520 | 2 | 11520 | 2 | 11520 | 2 | 11520 |
|  | 160 | 0.50 | 2 | 15360 | 2 | 15360 | 2 | 15360 | 2 | 15360 |
|  | 240 | 0.33 | 2 | 23040 | 2 | 23040 | 2 | 23040 | 2 | 23040 |
|  | 320 | 0.25 | 2 | 30720 | 2 | 30720 | 2 | 30720 | 2 | 30720 |
|  | 480 | 0.17 | 2 | 46080 | 2 | 46080 | 2 | 46080 | 2 | 46080 |
| 4800 | 20 | 5.00 | 6 | 5760 | 6 | 5760 | 4 | 3840 | 2 | 1920 |
|  | 22 | 4.55 | 6 | 6336 | 6 | 6336 | 4 | 4224 | 2 | 2112 |
|  | 26 | 3.85 | 6 | 7488 | 4 | 4992 | 2 | 2496 | 2 | 2496 |
|  | 32 | 3.13 | 6 | 9216 | 4 | 6144 | 2 | 3072 | 2 | 3072 |
|  | 38 | 2.63 | 4 | 7296 | 2 | 3648 | 2 | 3648 | 2 | 3648 |
|  | 50 | 2.00 | 4 | 9600 | 2 | 4800 | 2 | 4800 | 2 | 4800 |
|  | 64 | 1.56 | 4 | 12288 | 2 | 6144 | 2 | 6144 | 2 | 6144 |
|  | 76 | 1.32 | 2 | 7296 | 2 | 7296 | 2 | 7296 | 2 | 7296 |
|  | 100 | 1.00 | 2 | 9600 | 2 | 9600 | 2 | 9600 | 2 | 9600 |
|  | 150 | 0.67 | 2 | 14400 | 2 | 14400 | 2 | 14400 | 2 | 14400 |
|  | 200 | 0.50 | 2 | 19200 | 2 | 19200 | 2 | 19200 | 2 | 19200 |
|  | 300 | 0.33 | 2 | 28800 | 2 | 28800 | 2 | 28800 | 2 | 28800 |
|  | 400 | 0.25 | 2 | 38400 | 2 | 38400 | 2 | 38400 | 2 | 38400 |

The MPRs and modulation orders (M) at the initial transmission (k=0) may be consulted with Table 1. The range of the MPR changes at the retransmissions (k=1, 2, 3), and the modulation orders are gradually lowered according to the number of re-transmissions. When the modulation order is lowered while using the same number of subchannels, the number of bits of a transmission block is also reduced. If the same number of subchannels as that of the initial transmission is used at the retransmission, only the modulation order is lowered and no extra control information is used. If the number of subchannels used for retransmission is changed, the number of subchannels may be informed through a control channel. By determining a scheme, in which the number of subchannels used depending on the number of retransmissions is fixed or changed, according to a certain rule, the UE can be aware of the number of sub-channels allocated at the initial transmission and modulation orders applied to retransmissions without extra signaling.

Meanwhile, a modulation and coding scheme (MCS) with respect to retransmission may be configured as an MCS table based on the number of retransmissions or may be calculated based on an MCS table with respect to an initial transmission. When the MCS with respect to the initial transmission is determined, the MCS table according to the number of retransmissions or the calculated MCS with respect to retransmission may be applied at retransmissions.

Equation 2 represents the relationship among MPR, modulation order MO, and code rate CR.

MathFigure 2

$$\text{MPR(Spectral Efficiency)} = MO \times CR \qquad [\text{Math.2}]$$

When the MCS with respect to retransmission is determined, a modulation order and code rate at retransmission are determined, so the MPR value with respect to re-transmission may be obtained. The calculated MPR value may be applied as it is to perform retransmission or the range of MPR may be changed as represented by Equation 1 to perform retransmission.

Table 3 below shows an example of an MCS table including determined 16-level code rates and modulation orders for the initial transmission. MPR is calculated according to the determined code rates and modulation orders.

TABLE 3

| MCS Index | Target Code Rate | Modulation Order | Spectral Efficiency |
|---|---|---|---|
| 0 | 35/256 0.1367 | 2 | 0.2734 |
| 1 | 51/256 0.1992 | 2 | 0.3984 |
| 2 | 74/256 0.2891 | 2 | 0.5781 |
| 3 | 106/256 0.4141 | 2 | 0.8281 |
| 4 | 138/256 0.5391 | 2 | 1.0781 |
| 5 | 172/256 0.6719 | 2 | 1.3438 |
| 6 | 202/256 0.7891 | 2 | 1.5781 |
| 7 | 130/256 0.5078 | 4 | 2.0313 |
| 8 | 156/256 0.6094 | 4 | 2.4375 |
| 9 | 184/256 0.7188 | 4 | 2.8750 |
| 10 | 208/256 0.8125 | 4 | 3.2500 |
| 11 | 231/256 0.9023 | 4 | 3.6094 |
| 12 | 174/256 0.6797 | 6 | 4.0781 |
| 13 | 198/256 0.7734 | 6 | 4.6406 |
| 14 | 220/256 0.8594 | 6 | 5.1563 |
| 15 | 240/256 0.9375 | 6 | 5.6250 |

The code rates and modulation orders may be determined according to MCS indexes, and corresponding MPRs may be determined. With the defined MCS table, the BS can inform the UE about the code rates, modulation orders, MPRs, and the like, by the MCS indexes.

Table 4 below shows an example of an MCS table including the MPR range adjusted by using the values $\alpha$ and $\beta$ according to a proposed scheme, wherein $\alpha=1.5$, $\beta=0.5$, QPSK_LIMIT=1.57, and 16 QAM_LIMIT=3.76.

TABLE 4

| MCS Index | Target Code Rate | Mod | Spectral Efficiency | Overall Code Rate | Overall Efficiency |
|---|---|---|---|---|---|
| | | Initial Tx | | | |
| 0 | 35/256 0.1367 | 2 | 0.2734 | | |
| 1 | 51/256 0.1992 | 2 | 0.3984 | | |
| 2 | 74/256 0.2891 | 2 | 0.5781 | | |
| 3 | 106/256 0.4141 | 2 | 0.8281 | | |
| 4 | 138/256 0.5391 | 2 | 1.0781 | | |
| 5 | 172/256 0.6719 | 2 | 1.3438 | | |
| 6 | 202/256 0.7891 | 2 | 1.5781 | | |
| 7 | 130/256 0.5078 | 4 | 2.0313 | | |
| 8 | 156/256 0.6094 | 4 | 2.4375 | | |
| 9 | 184/256 0.7188 | 4 | 2.8750 | | |
| 10 | 208/256 0.8125 | 4 | 3.2500 | | |
| 11 | 231/256 0.9023 | 4 | 3.6094 | | |
| 12 | 174/256 0.6797 | 6 | 4.0781 | | |
| 13 | 198/256 0.7734 | 6 | 4.6406 | | |
| 14 | 220/256 0.8594 | 6 | 5.1563 | | |
| 15 | 240/256 0.9375 | 6 | 5.6250 | | |
| | | 1st Re Tx | | | |
| 0 | 35/256 0.1367 | 2 | 0.2734 | 0.0684 | 0.1367 |
| 1 | 51/256 0.1992 | 2 | 0.3984 | 0.0996 | 0.1992 |
| 2 | 74/256 0.2891 | 2 | 0.5781 | 0.1445 | 0.2891 |
| 3 | 106/256 0.4141 | 2 | 0.8281 | 0.2070 | 0.4141 |
| 4 | 138/256 0.5391 | 2 | 1.0781 | 0.2695 | 0.5391 |
| 5 | 172/256 0.6719 | 2 | 1.3438 | 0.3359 | 0.6719 |
| 6 | 202/256 0.7891 | 2 | 1.5781 | 0.3945 | 0.7891 |
| 7 | 260/256 1.0156 | 2 | 2.0313 | 0.3385 | 1.0156 |
| 8 | 312/256 1.2188 | 2 | 2.4375 | 0.4063 | 1.2188 |
| 9 | 368/256 1.4375 | 2 | 2.8750 | 0.4792 | 1.4375 |
| 10 | 416/256 1.6250 | 2 | 3.2500 | 0.5417 | 1.6250 |
| 11 | 231/256 0.9023 | 4 | 3.6094 | 0.4512 | 1.8047 |
| 12 | 261/256 1.0195 | 4 | 4.0781 | 0.4078 | 2.0391 |
| 13 | 297/256 1.1602 | 4 | 4.6406 | 0.4641 | 2.3203 |
| 14 | 330/256 1.2891 | 4 | 5.1563 | 0.5156 | 2.5781 |
| 15 | 360/256 1.4063 | 4 | 5.6250 | 0.5625 | 2.8125 |
| | | 2nd Re Tx | | | |
| 0 | 35/256 0.1367 | 2 | 0.2734 | 0.0456 | 0.0911 |
| 1 | 51/256 0.1992 | 2 | 0.3984 | 0.0664 | 0.1328 |
| 2 | 74/256 0.2891 | 2 | 0.5781 | 0.0964 | 0.1927 |
| 3 | 106/256 0.4141 | 2 | 0.8281 | 0.1380 | 0.2760 |
| 4 | 138/256 0.5391 | 2 | 1.0781 | 0.1797 | 0.3594 |
| 5 | 172/256 0.6719 | 2 | 1.3438 | 0.2240 | 0.4479 |
| 6 | 202/256 0.7891 | 2 | 1.5781 | 0.2630 | 0.5260 |
| 7 | 260/256 1.0156 | 2 | 2.0313 | 0.2539 | 0.6771 |
| 8 | 312/256 1.2188 | 2 | 2.4375 | 0.3047 | 0.8125 |
| 9 | 368/256 1.4375 | 2 | 2.8750 | 0.3594 | 0.9583 |
| 10 | 416/256 1.6250 | 2 | 3.2500 | 0.4063 | 1.0833 |
| 11 | 462/256 1.8047 | 2 | 3.6094 | 0.3609 | 1.2031 |
| 12 | 522/256 2.0391 | 2 | 4.0781 | 0.3398 | 1.3594 |
| 13 | 594/256 2.3203 | 2 | 4.6406 | 0.3867 | 1.5469 |
| 14 | 330/256 1.2891 | 4 | 5.1563 | 0.3683 | 1.7188 |
| 15 | 360/256 1.4063 | 4 | 5.6250 | 0.4018 | 1.8750 |
| | | 3rd Re Tx | | | |
| 0 | 35/256 0.1367 | 2 | 0.2734 | 0.0342 | 0.0547 |
| 1 | 51/256 0.1992 | 2 | 0.3984 | 0.0498 | 0.0797 |
| 2 | 74/256 0.2891 | 2 | 0.5781 | 0.0723 | 0.1156 |
| 3 | 106/256 0.4141 | 2 | 0.8281 | 0.1035 | 0.1656 |
| 4 | 138/256 0.5391 | 2 | 1.0781 | 0.1348 | 0.2156 |
| 5 | 172/256 0.6719 | 2 | 1.3438 | 0.1680 | 0.2688 |
| 6 | 202/256 0.7891 | 2 | 1.5781 | 0.1973 | 0.3156 |
| 7 | 130/256 0.5078 | 2 | 1.0156 | 0.1693 | 0.3385 |
| 8 | 156/256 0.6094 | 2 | 1.2188 | 0.2031 | 0.4063 |
| 9 | 184/256 0.7188 | 2 | 1.4375 | 0.2396 | 0.4792 |
| 10 | 208/256 0.8125 | 2 | 1.6250 | 0.2708 | 0.5417 |
| 11 | 231/256 0.9023 | 2 | 1.8047 | 0.2578 | 0.6016 |
| 12 | 174/256 0.6797 | 2 | 1.3594 | 0.2266 | 0.5826 |
| 13 | 198/256 0.7734 | 2 | 1.5469 | 0.2578 | 0.6629 |
| 14 | 220/256 0.8594 | 2 | 1.7188 | 0.2578 | 0.7366 |
| 15 | 240/256 0.9375 | 2 | 1.8750 | 0.2813 | 0.8036 |

If the amount of used resources is same although the modulation scheme is changed, the spectral efficiency may be determined to be same with respect to the same MCS index at the initial transmission and each retransmission. And, the overall code rate and overall spectral efficiency may be calculated after each retransmission is performed. Here, the values $\alpha$ and $\beta$ are set so that the values of QPSK_LIMIT and 16 QAM_LIMIT can be applied for the overall spectral efficiency calculated after each re-transmission Table 5 below shows another example of the MCS table including an MPR range adjusted by using the values $\alpha$ and $\beta$ according to a proposed scheme, wherein $\alpha=0.5$, $\beta=0$, QPSK_LIMIT=1.57, and 16 QAM_LIMIT=3.76.

TABLE 5

| MCS Index | Target Code Rate | Mod | Spectral Efficiency |
|---|---|---|---|
| | | Initial Tx | |
| 0 | 35/256 0.1367 | 2 | 0.2734 |
| 1 | 51/256 0.1992 | 2 | 0.3984 |
| 2 | 74/256 0.2891 | 2 | 0.5781 |
| 3 | 106/256 0.4141 | 2 | 0.8281 |
| 4 | 138/256 0.5391 | 2 | 1.0781 |
| 5 | 172/256 0.6719 | 2 | 1.3438 |
| 6 | 202/256 0.7891 | 2 | 1.5781 |
| 7 | 130/256 0.5078 | 4 | 2.0313 |
| 8 | 156/256 0.6094 | 4 | 2.4375 |
| 9 | 184/256 0.7188 | 4 | 2.8750 |
| 10 | 208/256 0.8125 | 4 | 3.2500 |
| 11 | 231/256 0.9023 | 4 | 3.6094 |

TABLE 5-continued

| MCS Index | Target Code Rate | Mod | Spectral Efficiency | Overall Code Rate | Overall Efficiency |
|---|---|---|---|---|---|
| 12 | 174/256 | | 0.6797 | 6 | 4.0781 |
| 13 | 198/256 | | 0.7734 | 6 | 4.6406 |
| 14 | 220/256 | | 0.8594 | 6 | 5.1563 |
| 15 | 240/256 | | 0.9375 | 6 | 5.6250 |
| 1st Re Tx | | | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 156/256 | 0.6094 | 4 | 2.4375 | 0.3047 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 231/256 | 0.9023 | 4 | 3.6094 | 0.4512 | 1.8047 |
| 12 | 261/256 | 1.0195 | 4 | 4.0781 | 0.4078 | 2.0391 |
| 13 | 198/256 | 0.7734 | 6 | 4.6406 | 0.3867 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| 2nd Re Tx | | | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.2438 | 0.8125 |
| 9 | 184/256 | 0.7188 | 4 | 2.8750 | 0.2396 | 0.9583 |
| 10 | 208/256 | 0.8125 | 4 | 3.2500 | 0.2708 | 1.0833 |
| 11 | 231/256 | 0.9023 | 4 | 3.6094 | 0.3008 | 1.2031 |
| 12 | 261/256 | 1.0195 | 4 | 4.0781 | 0.2913 | 1.3594 |
| 13 | 297/256 | 1.1602 | 4 | 4.6406 | 0.2900 | 1.5469 |
| 14 | 220/256 | 0.8594 | 6 | 5.1563 | 0.2865 | 1.7188 |
| 15 | 240/256 | 0.9375 | 6 | 5.6250 | 0.3125 | 1.8750 |
| 3rd Re Tx | | | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.1741 | 0.4063 |
| 9 | 184/256 | 0.7188 | 2 | 1.4375 | 0.1797 | 0.4792 |
| 10 | 208/256 | 0.8125 | 4 | 3.2500 | 0.2031 | 0.6500 |
| 11 | 231/256 | 0.9023 | 4 | 3.6094 | 0.2256 | 0.7219 |
| 12 | 174/256 | 0.6797 | 4 | 2.7188 | 0.2039 | 0.7415 |
| 13 | 198/256 | 0.7734 | 4 | 3.0938 | 0.2109 | 0.8438 |
| 14 | 220/256 | 0.8594 | 4 | 3.4375 | 0.2148 | 0.9375 |
| 15 | 240/256 | 0.9375 | 6 | 5.6250 | 0.2344 | 1.1250 |

Table 6 below shows still another example of the MCS table including an MPR range adjusted by using the values $\alpha$ and $\beta$ according to a proposed scheme, wherein $\alpha=1.0$, $\beta=0$, QPSK_LIMIT=1.57, and 16 QAM_LIMIT=3.76.

TABLE 6

| | Initial Tx | | | |
|---|---|---|---|---|
| MCS Index | Target Code Rate | Mod | Spectral Efficiency | |
| 0 | 35/256 | 0.1367 | 2 | 0.2734 |
| 1 | 51/256 | 0.1992 | 2 | 0.3984 |

TABLE 6-continued

| 2 | 74/256 | 0.2891 | 2 | 0.5781 |
|---|---|---|---|---|
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 231/256 | 0.9023 | 4 | 3.6094 |
| 12 | 174/256 | 0.6797 | 6 | 4.0781 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

| MCS Index | Target Code Rate | Mod | Spectral Efficiency | Overall Code Rate | Overall Efficiency |
|---|---|---|---|---|---|
| 1st Re Tx | | | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 231/256 | 0.9023 | 4 | 3.6094 | 0.4512 | 1.8047 |
| 12 | 261/256 | 1.0195 | 4 | 4.0781 | 0.4078 | 2.0391 |
| 13 | 297/256 | 1.1602 | 4 | 4.6406 | 0.4641 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| 2nd Re Tx | | | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.2875 | 0.9583 |
| 10 | 416/256 | 1.6250 | 2 | 3.2500 | 0.3250 | 1.0833 |
| 11 | 231/256 | 0.9023 | 4 | 3.6094 | 0.3008 | 1.2031 |
| 12 | 261/256 | 1.0195 | 4 | 4.0781 | 0.2913 | 1.3594 |
| 13 | 297/256 | 1.1602 | 4 | 4.6406 | 0.3315 | 1.5469 |
| 14 | 330/256 | 1.2891 | 4 | 5.1563 | 0.3223 | 1.7188 |
| 15 | 360/256 | 1.4063 | 4 | 5.6250 | 0.3516 | 1.8750 |
| 3rd Re Tx | | | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2054 | 0.4792 |
| 10 | 208/256 | 0.8125 | 2 | 1.6250 | 0.2321 | 0.5417 |
| 11 | 231/256 | 0.9023 | 2 | 1.8047 | 0.2256 | 0.6016 |
| 12 | 174/256 | 0.6797 | 2 | 1.3594 | 0.2039 | 0.5826 |
| 13 | 198/256 | 0.7734 | 4 | 3.0938 | 0.2320 | 0.8438 |
| 14 | 220/256 | 0.8594 | 4 | 3.4375 | 0.2344 | 0.9375 |
| 15 | 240/256 | 0.9375 | 4 | 3.7500 | 0.2557 | 1.0227 |

Table 7 below shows yet another example of the MCS table including an MPR range adjusted by using the values $\alpha$ and $\beta$ according to a proposed scheme, wherein $\alpha=1.3$, $\beta=0$, QPSK_LIMIT=1.57, and 16 QAM_LIMIT=3.76.

TABLE 7

| | Initial Tx | | |
|---|---|---|---|
| MCS Index | Target Code Rate | Mod | Spectral Efficiency |
| 0 | 35/256 0.1367 | 2 | 0.2734 |
| 1 | 51/256 0.1992 | 2 | 0.3984 |
| 2 | 74/256 0.2891 | 2 | 0.5781 |
| 3 | 106/256 0.4141 | 2 | 0.8281 |
| 4 | 138/256 0.5391 | 2 | 1.0781 |
| 5 | 172/256 0.6719 | 2 | 1.3438 |
| 6 | 202/256 0.7891 | 2 | 1.5781 |
| 7 | 130/256 0.5078 | 4 | 2.0313 |
| 8 | 156/256 0.6094 | 4 | 2.4375 |
| 9 | 184/256 0.7188 | 4 | 2.8750 |
| 10 | 208/256 0.8125 | 4 | 3.2500 |
| 11 | 231/256 0.9023 | 4 | 3.6094 |
| 12 | 174/256 0.6797 | 6 | 4.0781 |
| 13 | 198/256 0.7734 | 6 | 4.6406 |
| 14 | 220/256 0.8594 | 6 | 5.1563 |
| 15 | 240/256 0.9375 | 6 | 5.6250 |

| MCS Index | Target Code Rate | Mod | Spectral Efficiency | Overall Code Rate | Overall Efficiency |
|---|---|---|---|---|---|
| | 1st Re Tx | | | | |
| 0 | 35/256 0.1367 | 2 | 0.2734 | 0.0684 | 0.1367 |
| 1 | 51/256 0.1992 | 2 | 0.3984 | 0.0996 | 0.1992 |
| 2 | 74/256 0.2891 | 2 | 0.5781 | 0.1445 | 0.2891 |
| 3 | 106/256 0.4141 | 2 | 0.8281 | 0.2070 | 0.4141 |
| 4 | 138/256 0.5391 | 2 | 1.0781 | 0.2695 | 0.5391 |
| 5 | 172/256 0.6719 | 2 | 1.3438 | 0.3359 | 0.6719 |
| 6 | 202/256 0.7891 | 2 | 1.5781 | 0.3945 | 0.7891 |
| 7 | 260/256 1.0156 | 2 | 2.0313 | 0.3385 | 1.0156 |
| 8 | 312/256 1.2188 | 2 | 2.4375 | 0.4063 | 1.2188 |
| 9 | 184/256 0.7188 | 4 | 2.8750 | 0.3594 | 1.4375 |
| 10 | 208/256 0.8125 | 4 | 3.2500 | 0.4063 | 1.6250 |
| 11 | 231/256 0.9023 | 4 | 3.6094 | 0.4512 | 1.8047 |
| 12 | 261/256 1.0195 | 4 | 4.0781 | 0.4078 | 2.0391 |
| 13 | 297/256 1.1602 | 4 | 4.6406 | 0.4641 | 2.3203 |
| 14 | 220/256 0.8594 | 6 | 5.1563 | 0.4297 | 2.5781 |
| 15 | 240/256 0.9375 | 6 | 5.6250 | 0.4688 | 2.8125 |
| | 2nd Re Tx | | | | |
| 0 | 35/256 0.1367 | 2 | 0.2734 | 0.0456 | 0.0911 |
| 1 | 51/256 0.1992 | 2 | 0.3984 | 0.0664 | 0.1328 |
| 2 | 74/256 0.2891 | 2 | 0.5781 | 0.0964 | 0.1927 |
| 3 | 106/256 0.4141 | 2 | 0.8281 | 0.1380 | 0.2760 |
| 4 | 138/256 0.5391 | 2 | 1.0781 | 0.1797 | 0.3594 |
| 5 | 172/256 0.6719 | 2 | 1.3438 | 0.2240 | 0.4479 |
| 6 | 202/256 0.7891 | 2 | 1.5781 | 0.2630 | 0.5260 |
| 7 | 260/256 1.0156 | 2 | 2.0313 | 0.2539 | 0.6771 |
| 8 | 312/256 1.2188 | 2 | 2.4375 | 0.3047 | 0.8125 |
| 9 | 368/256 1.4375 | 2 | 2.8750 | 0.2875 | 0.9583 |
| 10 | 416/256 1.6250 | 2 | 3.2500 | 0.3250 | 1.0833 |
| 11 | 462/256 1.8047 | 2 | 3.6094 | 0.3609 | 1.2031 |
| 12 | 522/256 2.0391 | 2 | 4.0781 | 0.3398 | 1.3594 |
| 13 | 297/256 1.1602 | 4 | 4.6406 | 0.3315 | 1.5469 |
| 14 | 330/256 1.2891 | 4 | 5.1563 | 0.3223 | 1.7188 |
| 15 | 360/256 1.4063 | 4 | 5.6250 | 0.3516 | 1.8750 |
| | 3rd Re Tx | | | | |
| 0 | 35/256 0.1367 | 2 | 0.2734 | 0.0342 | 0.0547 |
| 1 | 51/256 0.1992 | 2 | 0.3984 | 0.0498 | 0.0797 |
| 2 | 74/256 0.2891 | 2 | 0.5781 | 0.0723 | 0.1156 |
| 3 | 106/256 0.4141 | 2 | 0.8281 | 0.1035 | 0.1656 |
| 4 | 138/256 0.5391 | 2 | 1.0781 | 0.1348 | 0.2156 |
| 5 | 172/256 0.6719 | 2 | 1.3438 | 0.1680 | 0.2688 |
| 6 | 202/256 0.7891 | 2 | 1.5781 | 0.1973 | 0.3156 |
| 7 | 130/256 0.5078 | 2 | 1.0156 | 0.1693 | 0.3385 |
| 8 | 156/256 0.6094 | 2 | 1.2188 | 0.2031 | 0.4063 |
| 9 | 184/256 0.7188 | 2 | 1.4375 | 0.2054 | 0.4792 |
| 10 | 208/256 0.8125 | 2 | 1.6250 | 0.2321 | 0.5417 |
| 11 | 231/256 0.9023 | 2 | 1.8047 | 0.2578 | 0.6016 |
| 12 | 174/256 0.6797 | 2 | 1.3594 | 0.2266 | 0.5826 |
| 13 | 198/256 0.7734 | 2 | 1.5469 | 0.2320 | 0.6629 |
| 14 | 220/256 0.8594 | 2 | 1.7188 | 0.2344 | 0.7366 |
| 15 | 240/256 0.9375 | 4 | 3.7500 | 0.2557 | 1.0227 |

Table 8 below shows another example of the MCS table including an MPR range adjusted by using the values $\alpha$ and $\beta$ according to a proposed scheme, wherein $\alpha=1.5$, $\beta=0$, QPSK_LIMIT=1.57, and 16 QAM_LIMIT=3.76.

TABLE 8

| | Initial Tx | | |
|---|---|---|---|
| MCS Index | Target Code Rate | Mod | Spectral Efficiency |
| 0 | 35/256 0.1367 | 2 | 0.2734 |
| 1 | 51/256 0.1992 | 2 | 0.3984 |
| 2 | 74/256 0.2891 | 2 | 0.5781 |
| 3 | 106/256 0.4141 | 2 | 0.8281 |
| 4 | 138/256 0.5391 | 2 | 1.0781 |
| 5 | 172/256 0.6719 | 2 | 1.3438 |
| 6 | 202/256 0.7891 | 2 | 1.5781 |
| 7 | 130/256 0.5078 | 4 | 2.0313 |
| 8 | 156/256 0.6094 | 4 | 2.4375 |
| 9 | 184/256 0.7188 | 4 | 2.8750 |
| 10 | 208/256 0.8125 | 4 | 3.2500 |
| 11 | 231/256 0.9023 | 4 | 3.6094 |
| 12 | 174/256 0.6797 | 6 | 4.0781 |
| 13 | 198/256 0.7734 | 6 | 4.6406 |
| 14 | 220/256 0.8594 | 6 | 5.1563 |
| 15 | 240/256 0.9375 | 6 | 5.6250 |

| MCS Index | Target Code Rate | Mod | Spectral Efficiency | Overall Code Rate | Overall Efficiency |
|---|---|---|---|---|---|
| | 1st Re Tx | | | | |
| 0 | 35/256 0.1367 | 2 | 0.2734 | 0.0684 | 0.1367 |
| 1 | 51/256 0.1992 | 2 | 0.3984 | 0.0996 | 0.1992 |
| 2 | 74/256 0.2891 | 2 | 0.5781 | 0.1445 | 0.2891 |
| 3 | 106/256 0.4141 | 2 | 0.8281 | 0.2070 | 0.4141 |
| 4 | 138/256 0.5391 | 2 | 1.0781 | 0.2695 | 0.5391 |
| 5 | 172/256 0.6719 | 2 | 1.3438 | 0.3359 | 0.6719 |
| 6 | 202/256 0.7891 | 2 | 1.5781 | 0.3945 | 0.7891 |
| 7 | 260/256 1.0156 | 2 | 2.0313 | 0.3385 | 1.0156 |
| 8 | 312/256 1.2188 | 2 | 2.4375 | 0.4063 | 1.2188 |
| 9 | 368/256 1.4375 | 2 | 2.8750 | 0.4792 | 1.4375 |
| 10 | 208/256 0.8125 | 4 | 3.2500 | 0.4063 | 1.6250 |
| 11 | 231/256 0.9023 | 4 | 3.6094 | 0.4512 | 1.8047 |
| 12 | 261/256 1.0195 | 4 | 4.0781 | 0.4078 | 2.0391 |
| 13 | 297/256 1.1602 | 4 | 4.6406 | 0.4641 | 2.3203 |
| 14 | 330/256 1.2891 | 4 | 5.1563 | 0.5156 | 2.5781 |
| 15 | 240/256 0.9375 | 6 | 5.6250 | 0.4688 | 2.8125 |
| | 2nd Re Tx | | | | |
| 0 | 35/256 0.1367 | 2 | 0.2734 | 0.0456 | 0.0911 |
| 1 | 51/256 0.1992 | 2 | 0.3984 | 0.0664 | 0.1328 |
| 2 | 74/256 0.2891 | 2 | 0.5781 | 0.0964 | 0.1927 |
| 3 | 106/256 0.4141 | 2 | 0.8281 | 0.1380 | 0.2760 |
| 4 | 138/256 0.5391 | 2 | 1.0781 | 0.1797 | 0.3594 |
| 5 | 172/256 0.6719 | 2 | 1.3438 | 0.2240 | 0.4479 |
| 6 | 202/256 0.7891 | 2 | 1.5781 | 0.2630 | 0.5260 |
| 7 | 260/256 1.0156 | 2 | 2.0313 | 0.2539 | 0.6771 |
| 8 | 312/256 1.2188 | 2 | 2.4375 | 0.3047 | 0.8125 |
| 9 | 368/256 1.4375 | 2 | 2.8750 | 0.3594 | 0.9583 |
| 10 | 416/256 1.6250 | 2 | 3.2500 | 0.3250 | 1.0833 |
| 11 | 462/256 1.8047 | 2 | 3.6094 | 0.3609 | 1.2031 |
| 12 | 522/256 2.0391 | 2 | 4.0781 | 0.3398 | 1.3594 |
| 13 | 297/256 1.1602 | 4 | 4.6406 | 0.3315 | 1.5469 |
| 14 | 330/256 1.2891 | 4 | 5.1563 | 0.3683 | 1.7188 |
| 15 | 360/256 1.4063 | 4 | 5.6250 | 0.3516 | 1.8750 |
| | 3rd Re Tx | | | | |
| 0 | 35/256 0.1367 | 2 | 0.2734 | 0.0342 | 0.0547 |
| 1 | 51/256 0.1992 | 2 | 0.3984 | 0.0498 | 0.0797 |
| 2 | 74/256 0.2891 | 2 | 0.5781 | 0.0723 | 0.1156 |
| 3 | 106/256 0.4141 | 2 | 0.8281 | 0.1035 | 0.1656 |
| 4 | 138/256 0.5391 | 2 | 1.0781 | 0.1348 | 0.2156 |
| 5 | 172/256 0.6719 | 2 | 1.3438 | 0.1680 | 0.2688 |
| 6 | 202/256 0.7891 | 2 | 1.5781 | 0.1973 | 0.3156 |
| 7 | 130/256 0.5078 | 2 | 1.0156 | 0.1693 | 0.3385 |
| 8 | 156/256 0.6094 | 2 | 1.2188 | 0.2031 | 0.4063 |
| 9 | 184/256 0.7188 | 2 | 1.4375 | 0.2396 | 0.4792 |
| 10 | 208/256 0.8125 | 2 | 1.6250 | 0.2321 | 0.5417 |

TABLE 8-continued

| | | | | | |
|---|---|---|---|---|---|
| 11 | 231/256 | 0.9023 | 2 | 1.8047 | 0.2578 | 0.6016 |
| 12 | 174/256 | 0.6797 | 2 | 1.3594 | 0.2266 | 0.5826 |
| 13 | 198/256 | 0.7734 | 2 | 1.5469 | 0.2320 | 0.6629 |
| 14 | 220/256 | 0.8594 | 2 | 1.7188 | 0.2578 | 0.7366 |
| 15 | 240/256 | 0.9375 | 2 | 1.8750 | 0.2557 | 0.8036 |

Table 9 below shows another example of the MCS table including an MPR range adjusted by using the values α and β according to a proposed scheme, wherein α=0.5, β=0, QPSK_LIMIT=1.57, and 16 QAM_LIMIT=3.76.

TABLE 9

| | Initial Tx | | | |
|---|---|---|---|---|
| MCS Index | Target Code Rate | | Mod | Spectral Efficiency |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 231/256 | 0.9023 | 4 | 3.6094 |
| 12 | 245/256 | 0.9570 | 4 | 3.8281 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

| MCS Index | Target Code Rate | | Mod | Spectral Efficiency | Overall Code Rate | Overall Efficiency |
|---|---|---|---|---|---|---|
| | 1st Re Tx | | | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 156/256 | 0.6094 | 4 | 2.4375 | 0.3047 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 231/256 | 0.9023 | 4 | 3.6094 | 0.4512 | 1.8047 |
| 12 | 245/256 | 0.9570 | 4 | 3.8281 | 0.4785 | 1.9141 |
| 13 | 198/256 | 0.7734 | 6 | 4.6406 | 0.3867 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| | 2nd Re Tx | | | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.2438 | 0.8125 |
| 9 | 184/256 | 0.7188 | 4 | 2.8750 | 0.2396 | 0.9583 |
| 10 | 208/256 | 0.8125 | 4 | 3.2500 | 0.2708 | 1.0833 |
| 11 | 231/256 | 0.9023 | 4 | 3.6094 | 0.3008 | 1.2031 |
| 12 | 245/256 | 0.9570 | 4 | 3.8281 | 0.3190 | 1.2760 |
| 13 | 297/256 | 1.1602 | 4 | 4.6406 | 0.2900 | 1.5469 |
| 14 | 220/256 | 0.8594 | 6 | 5.1563 | 0.2865 | 1.7188 |
| 15 | 240/256 | 0.9375 | 6 | 5.6250 | 0.3125 | 1.8750 |
| | 3rd Re Tx | | | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |

TABLE 9-continued

| | | | | | |
|---|---|---|---|---|---|
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.1741 | 0.4063 |
| 9 | 184/256 | 0.7188 | 2 | 1.4375 | 0.1797 | 0.4792 |
| 10 | 208/256 | 0.8125 | 4 | 3.2500 | 0.2031 | 0.6500 |
| 11 | 231/256 | 0.9023 | 4 | 3.6094 | 0.2256 | 0.7219 |
| 12 | 174/256 | 0.6797 | 4 | 2.7188 | 0.2171 | 0.7079 |
| 13 | 198/256 | 0.7734 | 4 | 3.0938 | 0.2109 | 0.8438 |
| 14 | 220/256 | 0.8594 | 4 | 3.4375 | 0.2148 | 0.9375 |
| 15 | 240/256 | 0.9375 | 6 | 5.6250 | 0.2344 | 1.1250 |

Table 10 below shows another example of the MCS table including an MPR range adjusted by using the values α and β according to a proposed scheme, wherein α=1.0, β=0, QPSK_LIMIT=1.57, and 16 QAM_LIMIT=3.76.

TABLE 10

| | Initial Tx | | | |
|---|---|---|---|---|
| MCS Index | Target Code Rate | | Mod | Spectral Efficiency |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 231/256 | 0.9023 | 4 | 3.6094 |
| 12 | 245/256 | 0.9570 | 4 | 3.8281 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

| MCS Index | Target Code Rate | | Mod | Spectral Efficiency | Overall Code Rate | Overall Efficiency |
|---|---|---|---|---|---|---|
| | 1st Re Tx | | | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 231/256 | 0.9023 | 4 | 3.6094 | 0.4512 | 1.8047 |
| 12 | 245/256 | 0.9570 | 4 | 3.8281 | 0.4785 | 1.9141 |
| 13 | 297/256 | 1.1602 | 4 | 4.6406 | 0.4641 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| | 2nd Re Tx | | | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.2875 | 0.9583 |

TABLE 10-continued

| | | | | | | |
|---|---|---|---|---|---|---|
| 10 | 416/256 | 1.6250 | 2 | 3.2500 | 0.3250 | 1.0833 |
| 11 | 231/256 | 0.9023 | 4 | 3.6094 | 0.3008 | 1.2031 |
| 12 | 245/256 | 0.9570 | 4 | 3.8281 | 0.3190 | 1.2760 |
| 13 | 297/256 | 1.1602 | 4 | 4.6406 | 0.3315 | 1.5469 |
| 14 | 330/256 | 1.2891 | 4 | 5.1563 | 0.3223 | 1.7188 |
| 15 | 360/256 | 1.4063 | 4 | 5.6250 | 0.3516 | 1.8750 |
| | | | 3rd Re Tx | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2054 | 0.4792 |
| 10 | 208/256 | 0.8125 | 2 | 1.6250 | 0.2321 | 0.5417 |
| 11 | 231/256 | 0.9023 | 2 | 1.8047 | 0.2256 | 0.6016 |
| 12 | 174/256 | 0.6797 | 2 | 1.3594 | 0.2171 | 0.5616 |
| 13 | 198/256 | 0.7734 | 4 | 3.0938 | 0.2320 | 0.8438 |
| 14 | 220/256 | 0.8594 | 4 | 3.4375 | 0.2344 | 0.9375 |
| 15 | 240/256 | 0.9375 | 4 | 3.7500 | 0.2557 | 1.0227 |

Table 11 below shows another example of the MCS table including an MPR range adjusted by using the values α and β according to a proposed scheme, wherein α=1.3, β=0, QPSK_LIMIT=1.57, and 16 QAM_LIMIT=3.76.

TABLE 11

| | Initial Tx | | | |
|---|---|---|---|---|
| MCS Index | Target Code Rate | | Mod | Spectral Efficiency |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 231/256 | 0.9023 | 4 | 3.6094 |
| 12 | 245/256 | 0.9570 | 4 | 3.8281 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

| MCS Index | Target Code Rate | | Mod | Spectral Efficiency | Overall Code Rate | Overall Efficiency |
|---|---|---|---|---|---|---|
| | | | 1st Re Tx | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 231/256 | 0.9023 | 4 | 3.6094 | 0.4512 | 1.8047 |
| 12 | 245/256 | 0.9570 | 4 | 3.8281 | 0.4785 | 1.9141 |
| 13 | 297/256 | 1.1602 | 4 | 4.6406 | 0.4641 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |

TABLE 11-continued

| | | | 2nd Re Tx | | | |
|---|---|---|---|---|---|---|
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.2875 | 0.9583 |
| 10 | 416/256 | 1.6250 | 2 | 3.2500 | 0.3250 | 1.0833 |
| 11 | 462/256 | 1.8047 | 2 | 3.6094 | 0.3609 | 1.2031 |
| 12 | 490/256 | 1.9141 | 2 | 3.8281 | 0.3828 | 1.2760 |
| 13 | 297/256 | 1.1602 | 4 | 4.6406 | 0.3315 | 1.5469 |
| 14 | 330/256 | 1.2891 | 4 | 5.1563 | 0.3223 | 1.7188 |
| 15 | 360/256 | 1.4063 | 4 | 5.6250 | 0.3516 | 1.8750 |
| | | | 3rd Re Tx | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2054 | 0.4792 |
| 10 | 208/256 | 0.8125 | 2 | 1.6250 | 0.2321 | 0.5417 |
| 11 | 231/256 | 0.9023 | 2 | 1.8047 | 0.2578 | 0.6016 |
| 12 | 174/256 | 0.6797 | 2 | 1.3594 | 0.2449 | 0.5616 |
| 13 | 198/256 | 0.7734 | 4 | 1.5469 | 0.2320 | 0.6629 |
| 14 | 220/256 | 0.8594 | 4 | 1.7188 | 0.2344 | 0.7366 |
| 15 | 240/256 | 0.9375 | 4 | 3.7500 | 0.2557 | 1.0227 |

Table 12 below shows another example of the MCS table including an MPR range adjusted by using the values α and β according to a proposed scheme, wherein α=1.5, β=0, QPSK_LIMIT=1.57, and 16 QAM_LIMIT=3.76.

TABLE 12

| | Initial Tx | | | |
|---|---|---|---|---|
| MCS Index | Target Code Rate | | Mod | Spectral Efficiency |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 231/256 | 0.9023 | 4 | 3.6094 |
| 12 | 245/256 | 0.9570 | 4 | 3.8281 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

| MCS Index | Target Code Rate | | Mod | Spectral Efficiency | Overall Code Rate | Overall Efficiency |
|---|---|---|---|---|---|---|
| | | | 1st Re Tx | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |

TABLE 12-continued

| | | | | | | |
|---|---|---|---|---|---|---|
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 368/256 | 1.4375 | 2 | 2.8750 | 0.4792 | 1.4375 |
| 10 | 208/256 | 0.8125 | 4 | 3.2500 | 0.4063 | 1.6250 |
| 11 | 231/256 | 0.9023 | 4 | 3.6094 | 0.4512 | 1.8047 |
| 12 | 245/256 | 0.9570 | 4 | 3.8281 | 0.4785 | 1.9141 |
| 13 | 297/256 | 1.1602 | 4 | 4.6406 | 0.4641 | 2.3203 |
| 14 | 330/256 | 1.2891 | 4 | 5.1563 | 0.5156 | 2.5781 |
| 15 | 240/256 | 0.9375 | 6 | 5.6250 | 0.4688 | 2.8125 |
| 2nd Re Tx | | | | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.3594 | 0.9583 |
| 10 | 416/256 | 1.6250 | 2 | 3.2500 | 0.3250 | 1.0833 |
| 11 | 462/256 | 1.8047 | 2 | 3.6094 | 0.3609 | 1.2031 |
| 12 | 490/256 | 1.9141 | 2 | 3.8281 | 0.3828 | 1.2760 |
| 13 | 297/256 | 1.1602 | 4 | 4.6406 | 0.3315 | 1.5469 |
| 14 | 330/256 | 1.2891 | 4 | 5.1563 | 0.3683 | 1.7188 |
| 15 | 360/256 | 1.4063 | 4 | 5.6250 | 0.3516 | 1.8750 |
| 3rd Re Tx | | | | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2396 | 0.4792 |
| 10 | 208/256 | 0.8125 | 2 | 1.6250 | 0.2321 | 0.5417 |
| 11 | 231/256 | 0.9023 | 2 | 1.8047 | 0.2578 | 0.6016 |
| 12 | 174/256 | 0.6797 | 2 | 1.3594 | 0.2449 | 0.5616 |
| 13 | 198/256 | 0.7734 | 2 | 1.5469 | 0.2320 | 0.6629 |
| 14 | 220/256 | 0.8594 | 2 | 1.7188 | 0.2578 | 0.7366 |
| 15 | 240/256 | 0.9375 | 2 | 1.8750 | 0.2557 | 0.8036 |

Table 13 below shows another example of the MCS table including an MPR range adjusted by using the values $\alpha$ and $\beta$ according to a proposed scheme, wherein $\alpha=0.5$, $\beta=0$, QPSK_LIMIT=1.57, and 16 QAM_LIMIT=3.76.

TABLE 13

| | Initial Tx | | | |
|---|---|---|---|---|
| MCS Index | Target Code Rate | | Mod | Spectral Efficiency |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 148/256 | 0.5781 | 6 | 3.4688 |
| 12 | 174/256 | 0.6797 | 6 | 4.0781 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

TABLE 13-continued

| MCS Index | Target Code Rate | | Mod | Spectral Efficiency | Overall Code Rate | Overall Efficiency |
|---|---|---|---|---|---|---|
| 1st Re Tx | | | | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 156/256 | 0.6094 | 4 | 2.4375 | 0.3047 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 222/256 | 0.8672 | 4 | 3.4688 | 0.3469 | 1.7344 |
| 12 | 261/256 | 1.0195 | 4 | 4.0781 | 0.4078 | 2.0391 |
| 13 | 198/256 | 0.7734 | 6 | 4.6406 | 0.3867 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| 2nd Re Tx | | | | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.2438 | 0.8125 |
| 9 | 184/256 | 0.7188 | 4 | 2.8750 | 0.2396 | 0.9583 |
| 10 | 208/256 | 0.8125 | 4 | 3.2500 | 0.2708 | 1.0833 |
| 11 | 222/256 | 0.8672 | 4 | 3.4688 | 0.2478 | 1.1563 |
| 12 | 261/256 | 1.0195 | 4 | 4.0781 | 0.2913 | 1.3594 |
| 13 | 297/256 | 1.1602 | 4 | 4.6406 | 0.2900 | 1.5469 |
| 14 | 220/256 | 0.8594 | 6 | 5.1563 | 0.2865 | 1.7188 |
| 15 | 240/256 | 0.9375 | 6 | 5.6250 | 0.3125 | 1.8750 |
| 3rd Re Tx | | | | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.1741 | 0.4063 |
| 9 | 184/256 | 0.7188 | 2 | 1.4375 | 0.1797 | 0.4792 |
| 10 | 208/256 | 0.8125 | 4 | 3.2500 | 0.2031 | 0.6500 |
| 11 | 231/256 | 0.9023 | 4 | 3.6094 | 0.1944 | 0.6992 |
| 12 | 174/256 | 0.6797 | 4 | 2.7188 | 0.2039 | 0.7415 |
| 13 | 198/256 | 0.7734 | 4 | 3.0938 | 0.2109 | 0.8438 |
| 14 | 220/256 | 0.8594 | 4 | 3.4375 | 0.2148 | 0.9375 |
| 15 | 240/256 | 0.9375 | 6 | 5.6250 | 0.2344 | 1.1250 |

Table 14 below shows another example of the MCS table including an MPR range adjusted by using the values $\alpha$ and $\beta$ according to a proposed scheme, wherein $\alpha=1.0$, $\beta=0$, QPSK_LIMIT=1.57, and 16 QAM_LIMIT=3.76.

TABLE 14

| | Initial Tx | | | |
|---|---|---|---|---|
| MCS Index | Target Code Rate | | Mod | Spectral Efficiency |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |

TABLE 14-continued

| MCS Index | Target Code Rate | Mod | Spectral Efficiency | Overall Code Rate | Overall Efficiency |
|---|---|---|---|---|---|
| 5 | 172/256 | | 0.6719 | 2 | 1.3438 |
| 6 | 202/256 | | 0.7891 | 2 | 1.5781 |
| 7 | 130/256 | | 0.5078 | 4 | 2.0313 |
| 8 | 156/256 | | 0.6094 | 4 | 2.4375 |
| 9 | 184/256 | | 0.7188 | 4 | 2.8750 |
| 10 | 208/256 | | 0.8125 | 4 | 3.2500 |
| 11 | 148/256 | | 0.5781 | 6 | 3.4688 |
| 12 | 174/256 | | 0.6797 | 6 | 4.0781 |
| 13 | 198/256 | | 0.7734 | 6 | 4.6406 |
| 14 | 220/256 | | 0.8594 | 6 | 5.1563 |
| 15 | 240/256 | | 0.9375 | 6 | 5.6250 |

| MCS Index | Target Code Rate | | Mod | Spectral Efficiency | Overall Code Rate | Overall Efficiency |
|---|---|---|---|---|---|---|
| | | | 1st Re Tx | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 222/256 | 0.8672 | 4 | 3.4688 | 0.3469 | 1.7344 |
| 12 | 261/256 | 1.0195 | 4 | 4.0781 | 0.4078 | 2.0391 |
| 13 | 297/256 | 1.1602 | 4 | 4.6406 | 0.4641 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| | | | 2nd Re Tx | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.2875 | 0.9583 |
| 10 | 416/256 | 1.6250 | 2 | 3.2500 | 0.3250 | 1.0833 |
| 11 | 444/256 | 1.7344 | 2 | 3.4688 | 0.2891 | 1.1563 |
| 12 | 261/256 | 1.0195 | 4 | 4.0781 | 0.2913 | 1.3594 |
| 13 | 297/256 | 1.1602 | 4 | 4.6406 | 0.3315 | 1.5469 |
| 14 | 330/256 | 1.2891 | 4 | 5.1563 | 0.3223 | 1.7188 |
| 15 | 360/256 | 1.4063 | 4 | 5.6250 | 0.3516 | 1.8750 |
| | | | 3rd Re Tx | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2054 | 0.4792 |
| 10 | 208/256 | 0.8125 | 2 | 1.6250 | 0.2321 | 0.5417 |
| 11 | 231/256 | 0.9023 | 2 | 1.8047 | 0.2189 | 0.5857 |
| 12 | 174/256 | 0.6797 | 2 | 1.3594 | 0.2039 | 0.5826 |
| 13 | 198/256 | 0.7734 | 4 | 3.0938 | 0.2320 | 0.8438 |
| 14 | 220/256 | 0.8594 | 4 | 3.4375 | 0.2344 | 0.9375 |
| 15 | 240/256 | 0.9375 | 4 | 3.7500 | 0.2557 | 1.0227 |

Table 15 below shows another example of the MCS table including an MPR range adjusted by using the values α and β according to a proposed scheme, wherein α=1.3, β=0, QPSK_LIMIT=1.57, and 16 QAM_LIMIT=3.76.

TABLE 15

| MCS Index | Target Code Rate | | Mod | Spectral Efficiency |
|---|---|---|---|---|
| | | Initial Tx | | |
| 0 | 35/256 | 0.1367 | 2 | 0.2734 |
| 1 | 51/256 | 0.1992 | 2 | 0.3984 |
| 2 | 74/256 | 0.2891 | 2 | 0.5781 |
| 3 | 106/256 | 0.4141 | 2 | 0.8281 |
| 4 | 138/256 | 0.5391 | 2 | 1.0781 |
| 5 | 172/256 | 0.6719 | 2 | 1.3438 |
| 6 | 202/256 | 0.7891 | 2 | 1.5781 |
| 7 | 130/256 | 0.5078 | 4 | 2.0313 |
| 8 | 156/256 | 0.6094 | 4 | 2.4375 |
| 9 | 184/256 | 0.7188 | 4 | 2.8750 |
| 10 | 208/256 | 0.8125 | 4 | 3.2500 |
| 11 | 148/256 | 0.5781 | 6 | 3.4688 |
| 12 | 174/256 | 0.6797 | 6 | 4.0781 |
| 13 | 198/256 | 0.7734 | 6 | 4.6406 |
| 14 | 220/256 | 0.8594 | 6 | 5.1563 |
| 15 | 240/256 | 0.9375 | 6 | 5.6250 |

| MCS Index | Target Code Rate | | Mod | Spectral Efficiency | Overall Code Rate | Overall Efficiency |
|---|---|---|---|---|---|---|
| | | | 1st Re Tx | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 184/256 | 0.7188 | 4 | 2.8750 | 0.3594 | 1.4375 |
| 10 | 208/256 | 0.8125 | 4 | 3.2500 | 0.4063 | 1.6250 |
| 11 | 222/256 | 0.8672 | 4 | 3.4688 | 0.3469 | 1.7344 |
| 12 | 261/256 | 1.0195 | 4 | 4.0781 | 0.4078 | 2.0391 |
| 13 | 297/256 | 1.1602 | 4 | 4.6406 | 0.4641 | 2.3203 |
| 14 | 220/256 | 0.8594 | 6 | 5.1563 | 0.4297 | 2.5781 |
| 15 | 240/256 | 0.9375 | 6 | 5.6250 | 0.4688 | 2.8125 |
| | | | 2nd Re Tx | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.2875 | 0.9583 |
| 10 | 416/256 | 1.6250 | 2 | 3.2500 | 0.3250 | 1.0833 |
| 11 | 444/256 | 1.7344 | 2 | 3.4688 | 0.2891 | 1.1563 |
| 12 | 522/256 | 2.0391 | 2 | 4.0781 | 0.3398 | 1.3594 |
| 13 | 297/256 | 1.1602 | 4 | 4.6406 | 0.3315 | 1.5469 |
| 14 | 330/256 | 1.2891 | 4 | 5.1563 | 0.3223 | 1.7188 |
| 15 | 360/256 | 1.4063 | 4 | 5.6250 | 0.3516 | 1.8750 |
| | | | 3rd Re Tx | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2054 | 0.4792 |
| 10 | 208/256 | 0.8125 | 2 | 1.6250 | 0.2321 | 0.5417 |
| 11 | 231/256 | 0.9023 | 2 | 1.8047 | 0.2189 | 0.5857 |
| 12 | 174/256 | 0.6797 | 2 | 1.3594 | 0.2266 | 0.5826 |
| 13 | 198/256 | 0.7734 | 2 | 1.5469 | 0.2320 | 0.6629 |
| 14 | 220/256 | 0.8594 | 2 | 1.7188 | 0.2344 | 0.7366 |
| 15 | 240/256 | 0.9375 | 4 | 3.7500 | 0.2557 | 1.0227 |

Table 16 below shows another example of the MCS table including an MPR range adjusted by using the values α and β according to a proposed scheme, wherein α=1.5, β=0, QPSK_LIMIT=1.57, and 16 QAM_LIMIT=3.76.

TABLE 16

| MCS Index | Target Code Rate | Mod | Spectral Efficiency | | |
|---|---|---|---|---|---|
| | | Initial Tx | | | |
| 0 | 35/256 | 0.1367 | 2 | 0.2734 | |
| 1 | 51/256 | 0.1992 | 2 | 0.3984 | |
| 2 | 74/256 | 0.2891 | 2 | 0.5781 | |
| 3 | 106/256 | 0.4141 | 2 | 0.8281 | |
| 4 | 138/256 | 0.5391 | 2 | 1.0781 | |
| 5 | 172/256 | 0.6719 | 2 | 1.3438 | |
| 6 | 202/256 | 0.7891 | 2 | 1.5781 | |
| 7 | 130/256 | 0.5078 | 4 | 2.0313 | |
| 8 | 156/256 | 0.6094 | 4 | 2.4375 | |
| 9 | 184/256 | 0.7188 | 4 | 2.8750 | |
| 10 | 208/256 | 0.8125 | 4 | 3.2500 | |
| 11 | 148/256 | 0.5781 | 6 | 3.4688 | |
| 12 | 174/256 | 0.6797 | 6 | 4.0781 | |
| 13 | 198/256 | 0.7734 | 6 | 4.6406 | |
| 14 | 220/256 | 0.8594 | 6 | 5.1563 | |
| 15 | 240/256 | 0.9375 | 6 | 5.6250 | |

| MCS Index | Target Code Rate | Mod | Spectral Efficiency | Overall Code Rate | Overall Efficiency |
|---|---|---|---|---|---|
| | | 1st Re Tx | | | |
| 0 | 35/256 | 0.1367 | 2 | 0.2734 | 0.0684 | 0.1367 |
| 1 | 51/256 | 0.1992 | 2 | 0.3984 | 0.0996 | 0.1992 |
| 2 | 74/256 | 0.2891 | 2 | 0.5781 | 0.1445 | 0.2891 |
| 3 | 106/256 | 0.4141 | 2 | 0.8281 | 0.2070 | 0.4141 |
| 4 | 138/256 | 0.5391 | 2 | 1.0781 | 0.2695 | 0.5391 |
| 5 | 172/256 | 0.6719 | 2 | 1.3438 | 0.3359 | 0.6719 |
| 6 | 202/256 | 0.7891 | 2 | 1.5781 | 0.3945 | 0.7891 |
| 7 | 260/256 | 1.0156 | 2 | 2.0313 | 0.3385 | 1.0156 |
| 8 | 312/256 | 1.2188 | 2 | 2.4375 | 0.4063 | 1.2188 |
| 9 | 368/256 | 1.4375 | 2 | 2.8750 | 0.4792 | 1.4375 |
| 10 | 208/256 | 0.8125 | 4 | 3.2500 | 0.4063 | 1.6250 |
| 11 | 222/256 | 0.8672 | 4 | 3.4688 | 0.3469 | 1.7344 |
| 12 | 261/256 | 1.0195 | 4 | 4.0781 | 0.4078 | 2.0391 |
| 13 | 297/256 | 1.1602 | 4 | 4.6406 | 0.4641 | 2.3203 |
| 14 | 330/256 | 1.2891 | 4 | 5.1563 | 0.5156 | 2.5781 |
| 15 | 240/256 | 0.9375 | 6 | 5.6250 | 0.4688 | 2.8125 |
| | | 2nd Re Tx | | | |
| 0 | 35/256 | 0.1367 | 2 | 0.2734 | 0.0456 | 0.0911 |
| 1 | 51/256 | 0.1992 | 2 | 0.3984 | 0.0664 | 0.1328 |
| 2 | 74/256 | 0.2891 | 2 | 0.5781 | 0.0964 | 0.1927 |
| 3 | 106/256 | 0.4141 | 2 | 0.8281 | 0.1380 | 0.2760 |
| 4 | 138/256 | 0.5391 | 2 | 1.0781 | 0.1797 | 0.3594 |
| 5 | 172/256 | 0.6719 | 2 | 1.3438 | 0.2240 | 0.4479 |
| 6 | 202/256 | 0.7891 | 2 | 1.5781 | 0.2630 | 0.5260 |
| 7 | 260/256 | 1.0156 | 2 | 2.0313 | 0.2539 | 0.6771 |
| 8 | 312/256 | 1.2188 | 2 | 2.4375 | 0.3047 | 0.8125 |
| 9 | 368/256 | 1.4375 | 2 | 2.8750 | 0.3594 | 0.9583 |
| 10 | 416/256 | 1.6250 | 2 | 3.2500 | 0.3250 | 1.0833 |
| 11 | 444/256 | 1.7344 | 2 | 3.4688 | 0.2891 | 1.1563 |
| 12 | 522/256 | 2.0391 | 2 | 4.0781 | 0.3398 | 1.3594 |
| 13 | 297/256 | 1.1602 | 4 | 4.6406 | 0.3315 | 1.5469 |
| 14 | 330/256 | 1.2891 | 4 | 5.1563 | 0.3683 | 1.7188 |
| 15 | 360/256 | 1.4063 | 4 | 5.6250 | 0.3516 | 1.8750 |
| | | 3rd Re Tx | | | |
| 0 | 35/256 | 0.1367 | 2 | 0.2734 | 0.0342 | 0.0547 |
| 1 | 51/256 | 0.1992 | 2 | 0.3984 | 0.0498 | 0.0797 |
| 2 | 74/256 | 0.2891 | 2 | 0.5781 | 0.0723 | 0.1156 |
| 3 | 106/256 | 0.4141 | 2 | 0.8281 | 0.1035 | 0.1656 |
| 4 | 138/256 | 0.5391 | 2 | 1.0781 | 0.1348 | 0.2156 |
| 5 | 172/256 | 0.6719 | 2 | 1.3438 | 0.1680 | 0.2688 |
| 6 | 202/256 | 0.7891 | 2 | 1.5781 | 0.1973 | 0.3156 |
| 7 | 130/256 | 0.5078 | 2 | 1.0156 | 0.1693 | 0.3385 |
| 8 | 156/256 | 0.6094 | 2 | 1.2188 | 0.2031 | 0.4063 |
| 9 | 184/256 | 0.7188 | 2 | 1.4375 | 0.2396 | 0.4792 |
| 10 | 208/256 | 0.8125 | 2 | 1.6250 | 0.2321 | 0.5417 |
| 11 | 231/256 | 0.9023 | 2 | 1.8047 | 0.2189 | 0.5857 |
| 12 | 174/256 | 0.6797 | 2 | 1.3594 | 0.2266 | 0.5826 |
| 13 | 198/256 | 0.7734 | 2 | 1.5469 | 0.2320 | 0.6629 |
| 14 | 220/256 | 0.8594 | 2 | 1.7188 | 0.2578 | 0.7366 |
| 15 | 240/256 | 0.9375 | 2 | 1.8750 | 0.2557 | 0.8036 |

Tables 3 to 16 show the MCS tables with respect to three retransmissions of first re-transmission (1$^{st}$ Re Tx), second retransmission (2$^{nd}$ Re Tx) and third retransmission (3$^{rd}$ Re Tx), but there is no limitation in a maximum number of retransmissions, and an MCS table may be configured for a fourth and subsequent retransmissions. Various MCS tables may be configured by determining the values α and β as requested by a system, and an MCS table matching with the performance of a system may be se-lectively used.

In the non-adaptive HARQ in which transmission attributes used for the initial transmission are continuously used irrespective of a change in a channel state, control information for changing the transmission attributes is not transmitted at each re-transmission. In such a non-adaptive HARQ, the modulation order and the allocation amount of resources can be changed at retransmission to thereby ensure a reliable re-transmission and improve the system performance.

Figure 10:
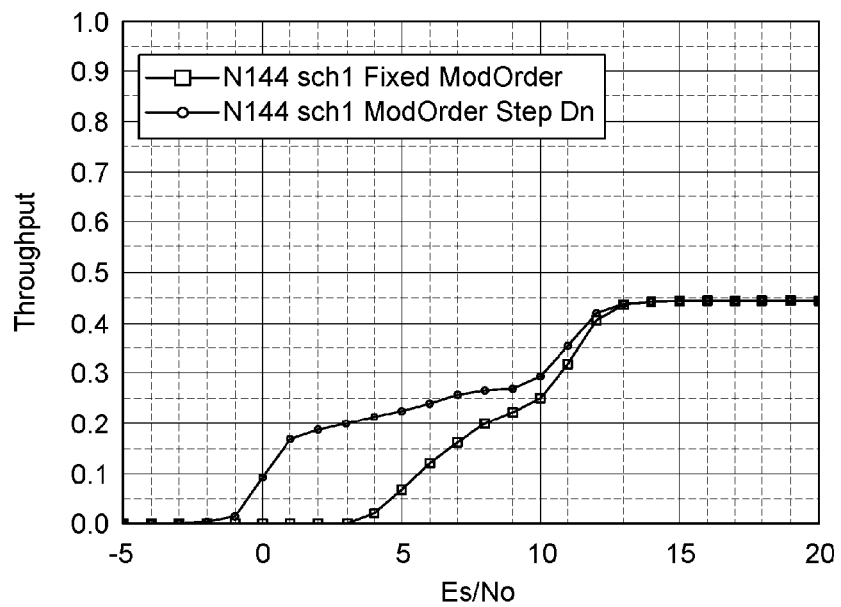
FIGS. 10 through 30 are graphs of results obtained by performing HARQ such that a modulation order is reduced according to the number of retransmissions.
Figure 11:
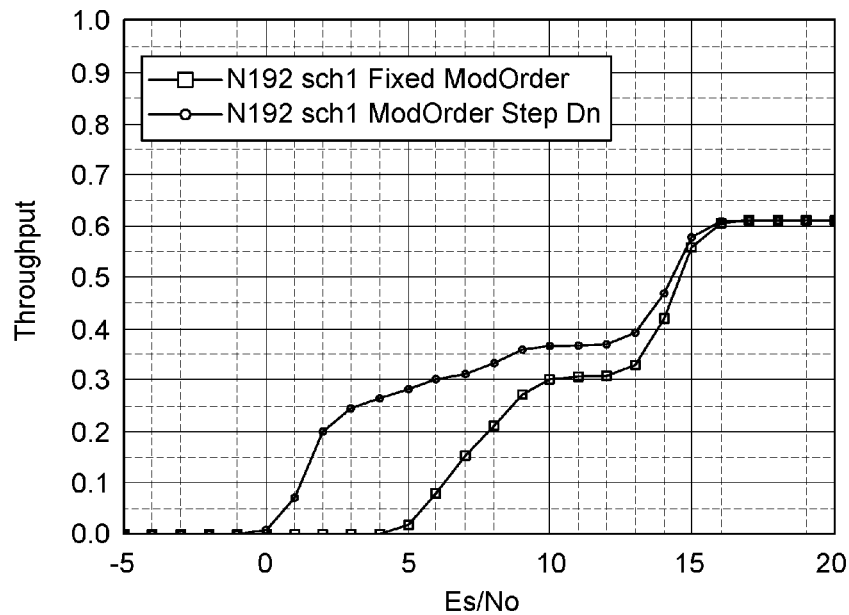
Figure 12:
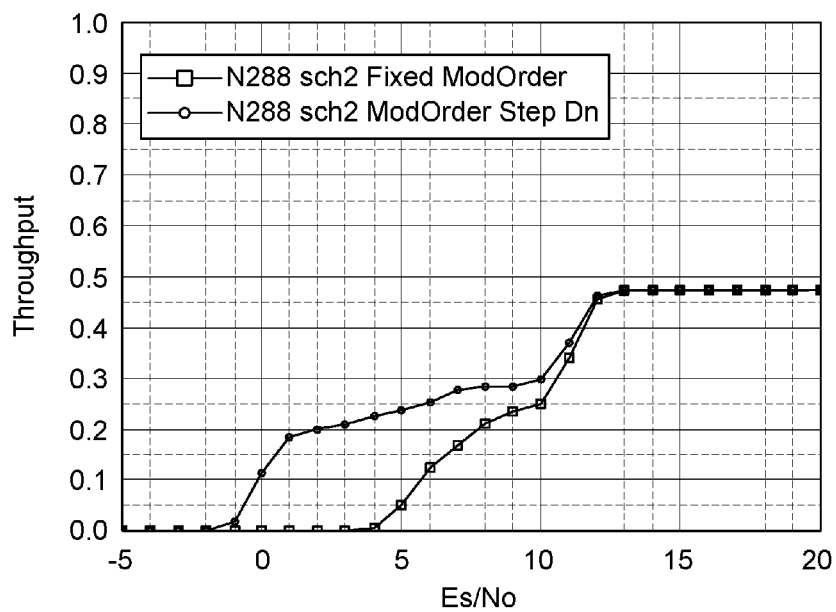
Figure 13:
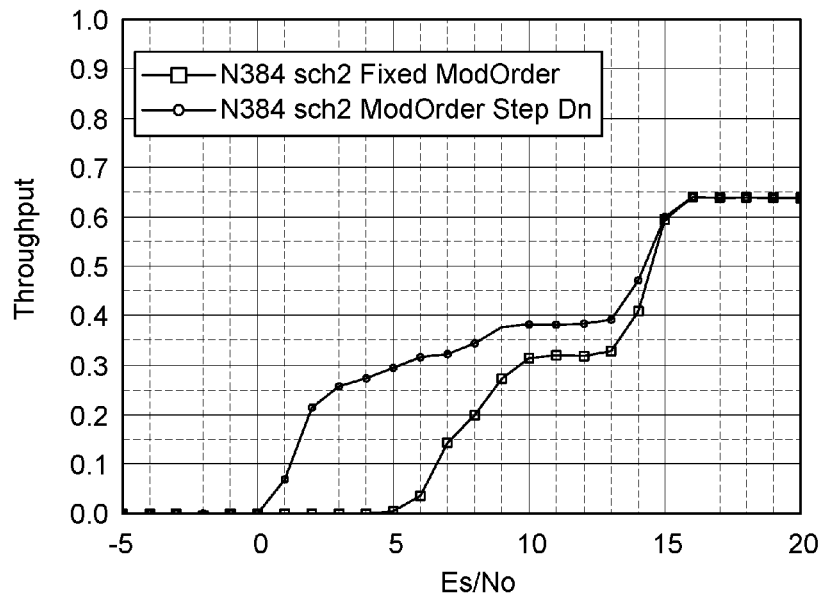
Figure 14:
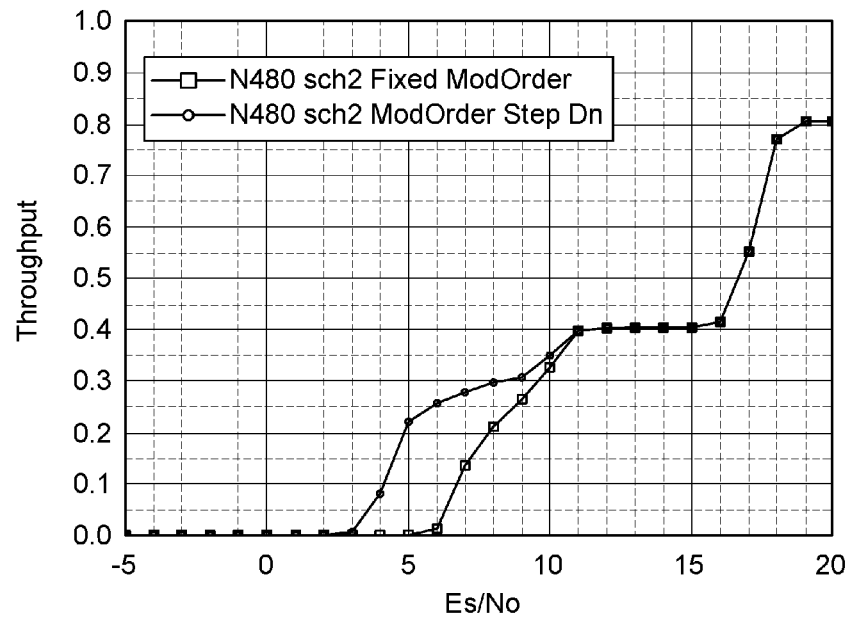
Figure 15:
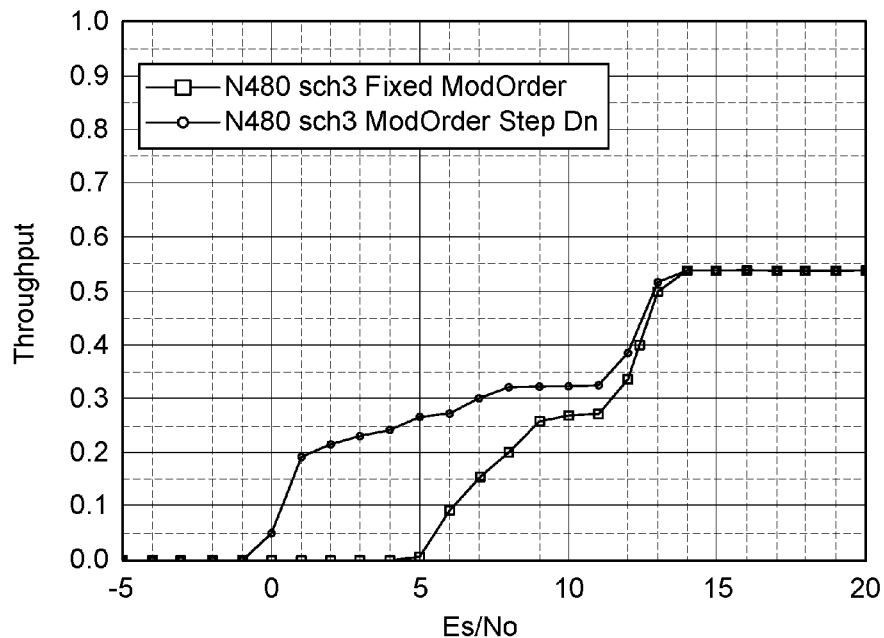
Figure 16:
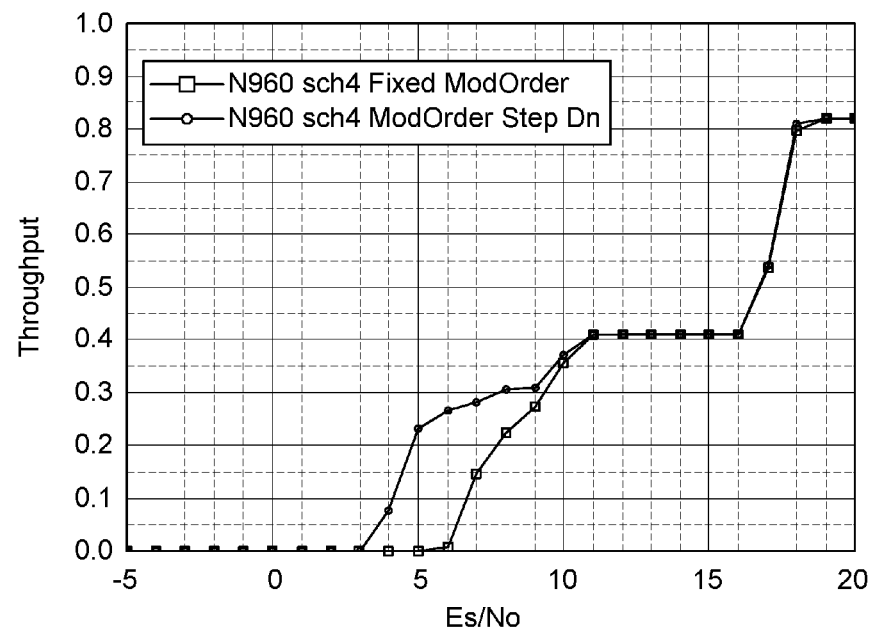
Figure 17:
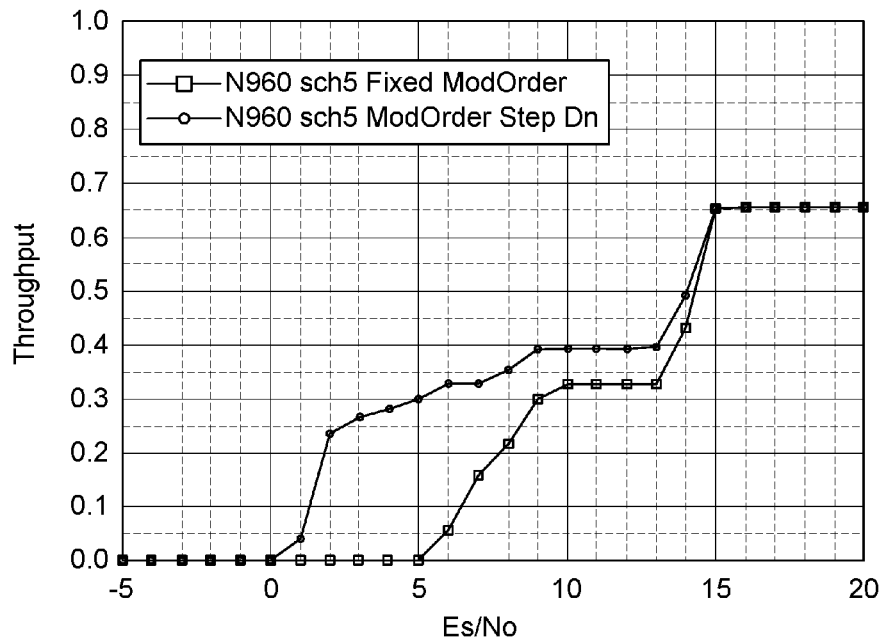
Figure 18:
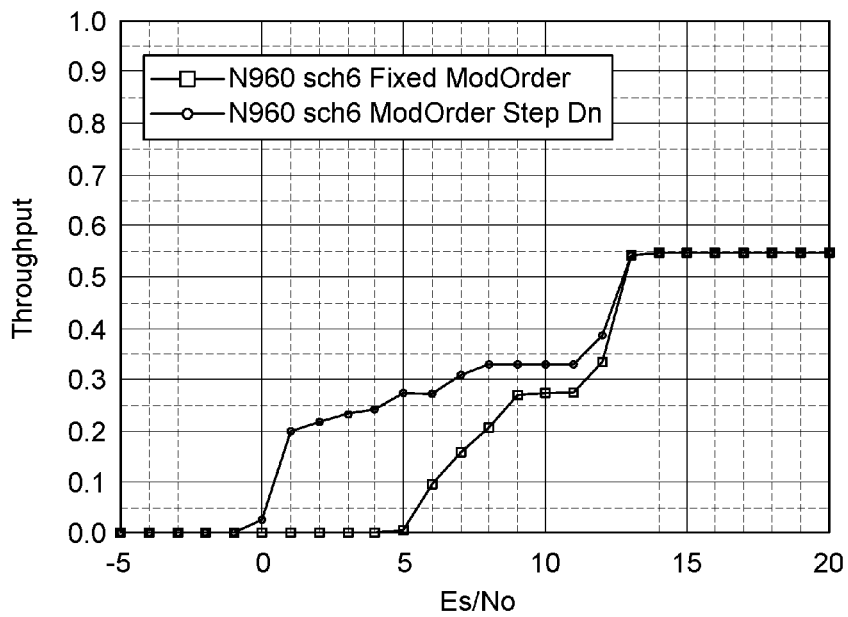
Figure 19:
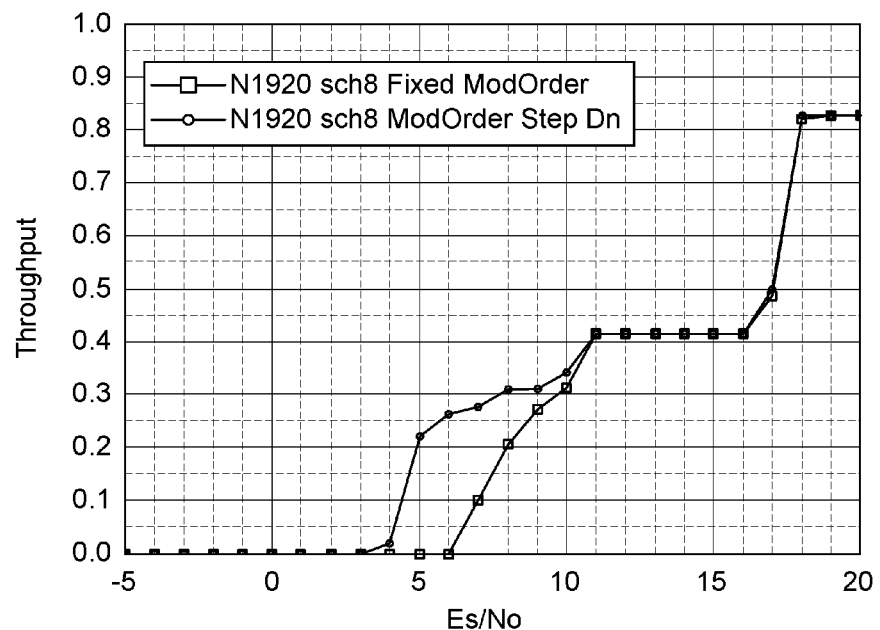
Figure 20:
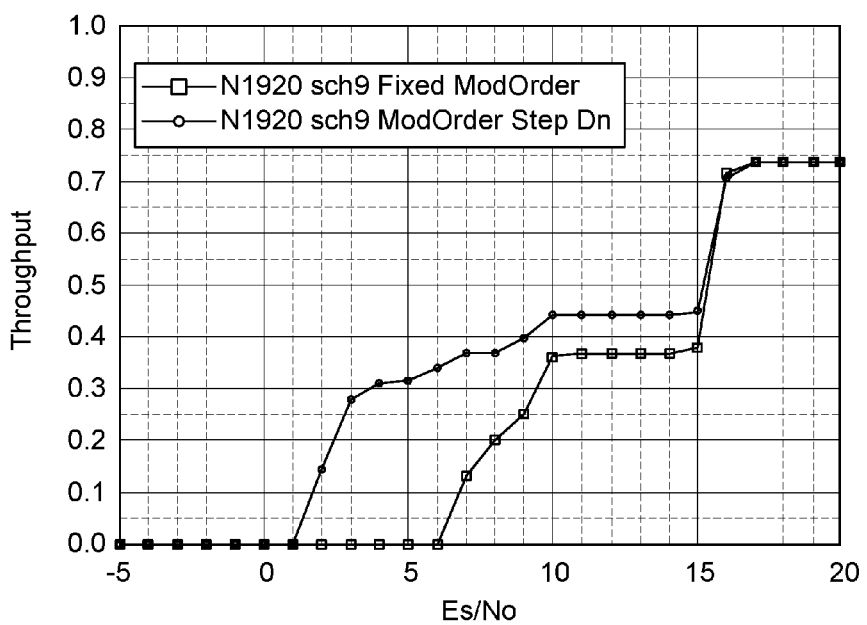
Figure 21:
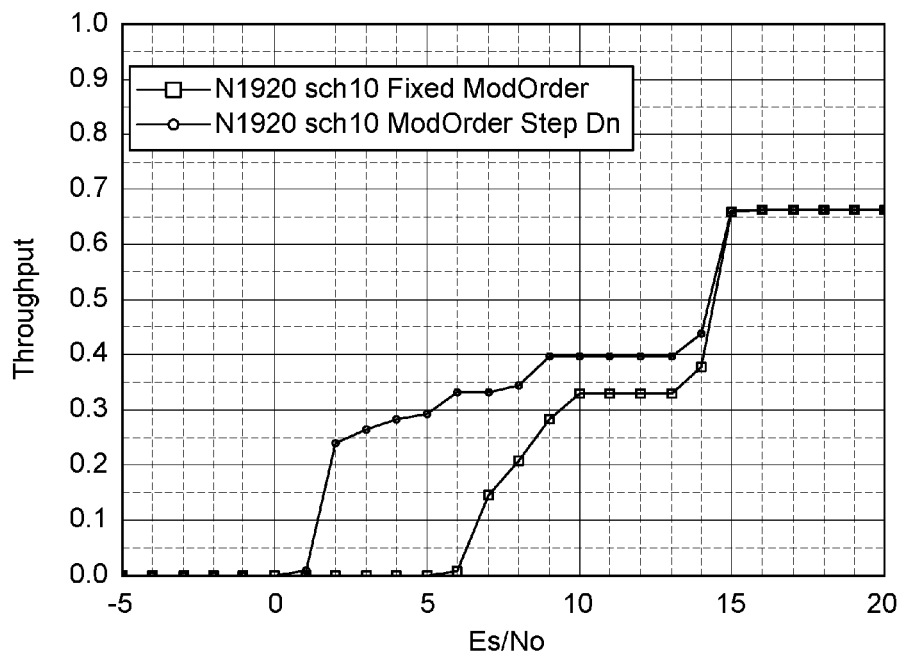
Figure 22:
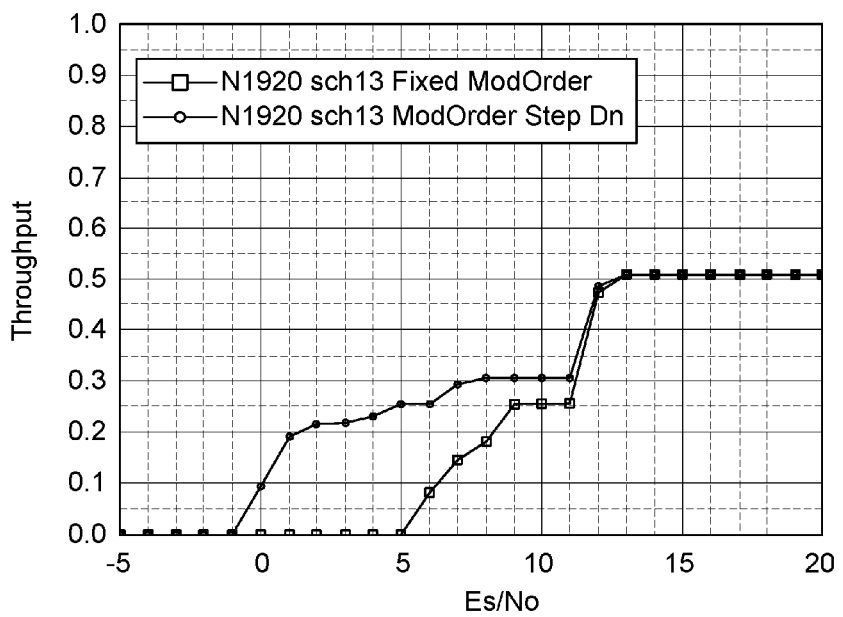
Figure 23:
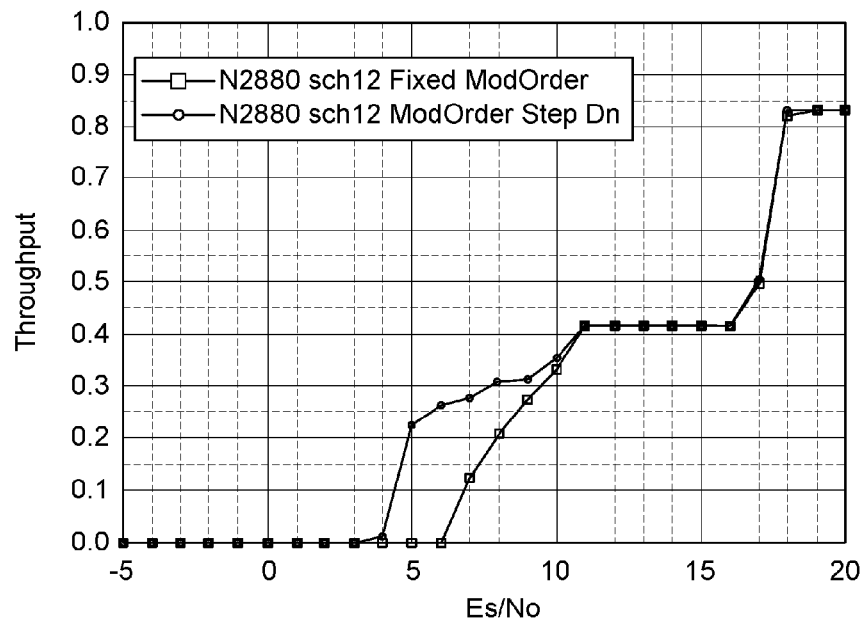
Figure 24:
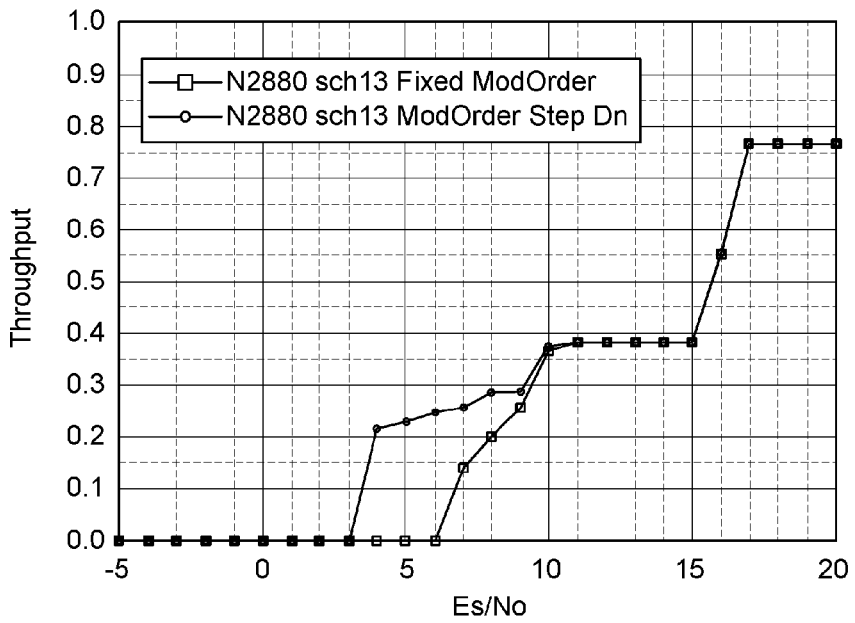
Figure 25:
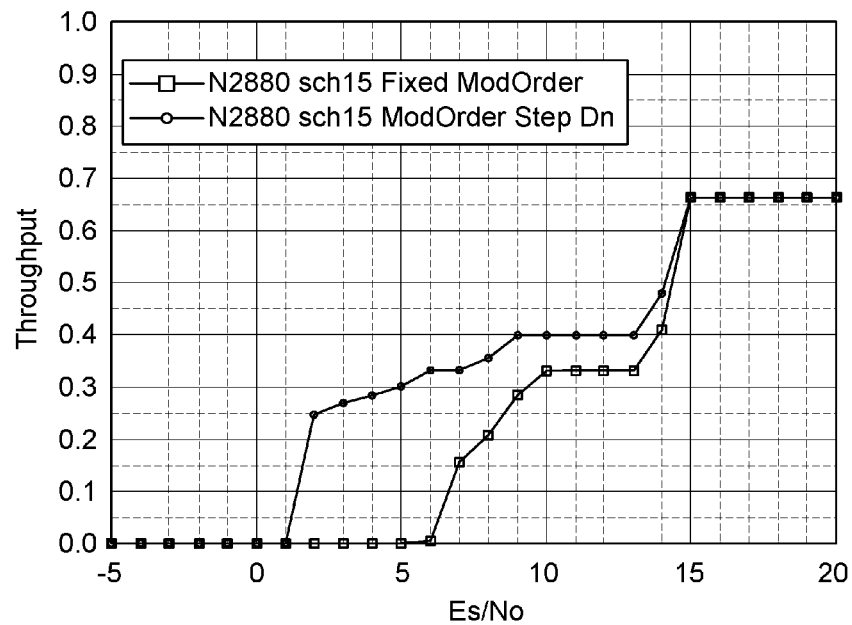
Figure 26:
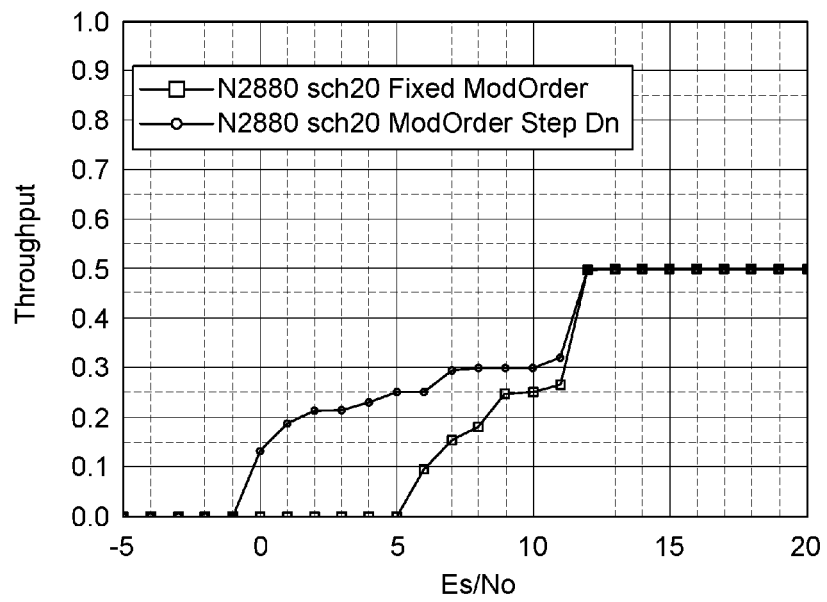
Figure 27:
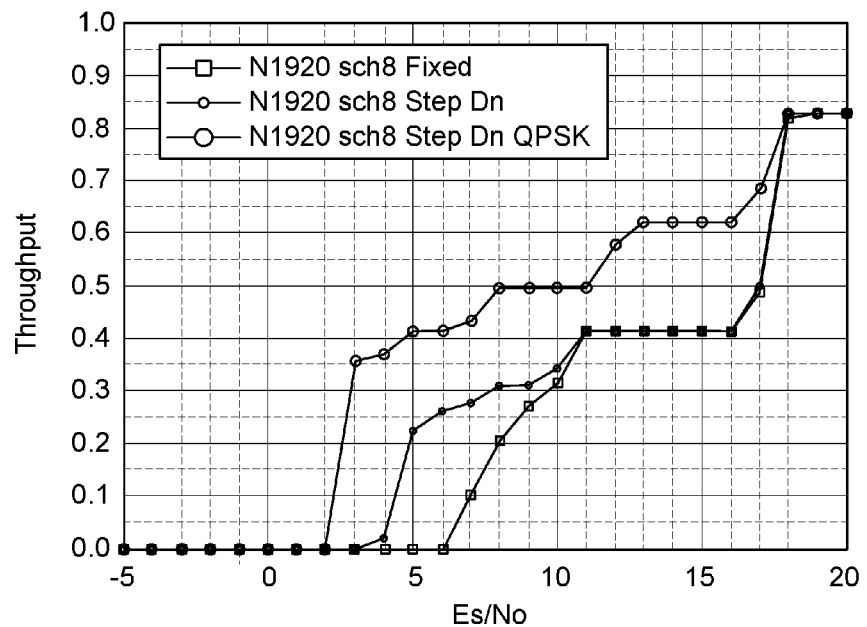
Figure 28:
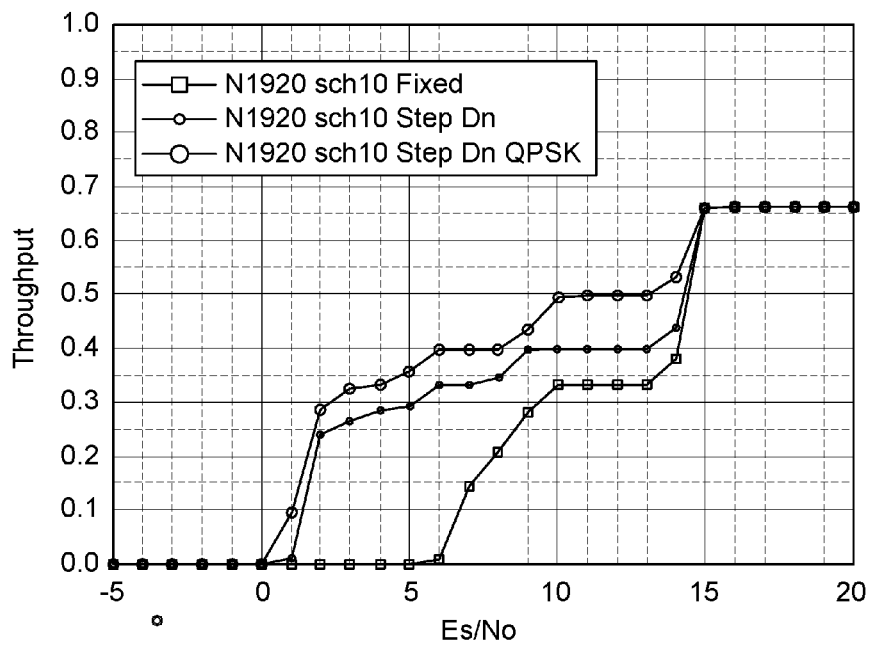
Figure 29:
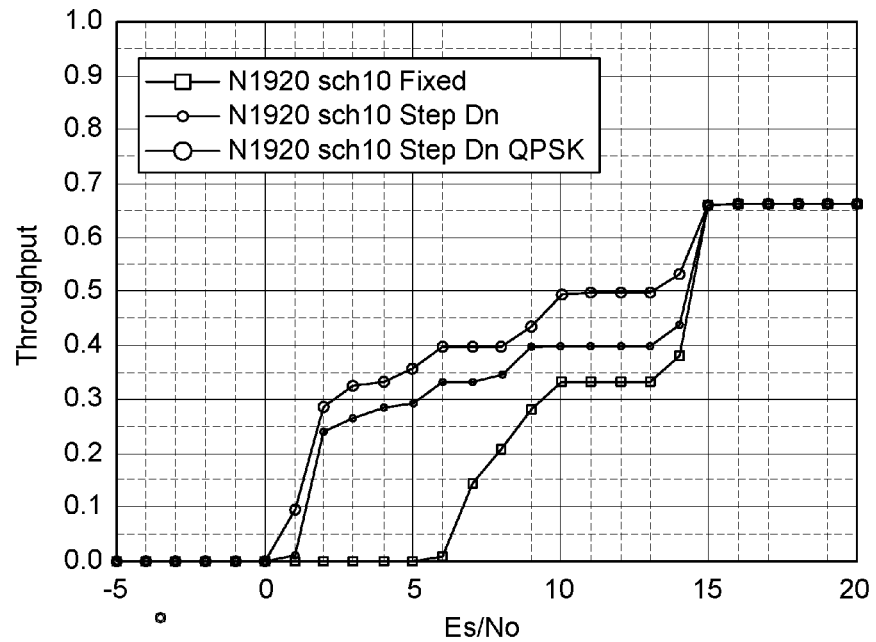
Figure 30:
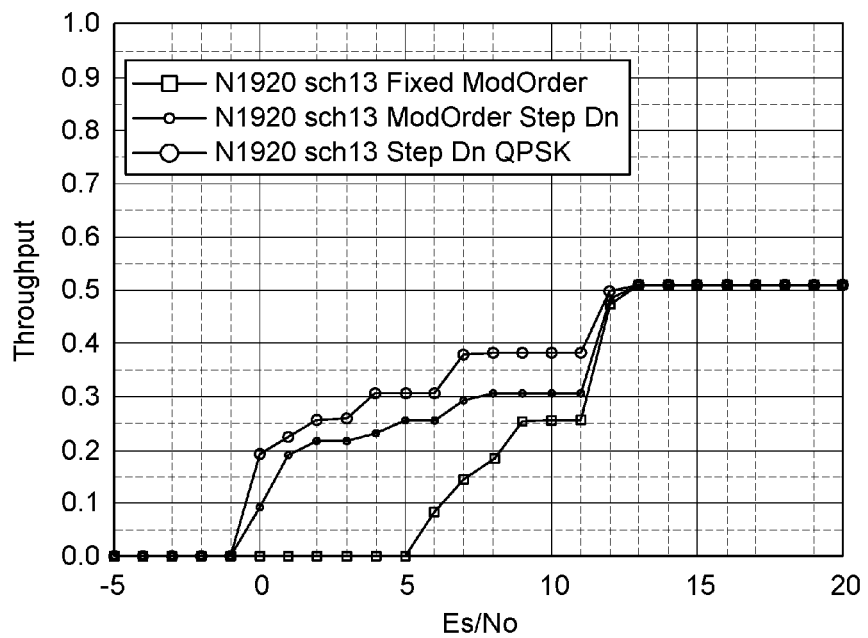

FIGS. 10 to 30 are graphs of results obtained by performing HARQ such that the modulation order is reduced according to the number of retransmissions, in which initial data and retransmission data are transmitted with the number of subchannels (Sch) determined for each particular $N_{EP}$. FIG. 10 shows the case where $N_{EP}$ is 144 and the number of subchannel is 1. FIG. 11 shows the case where $N_{EP}$ is 192 and the number of channel is 1. FIG. 12 shows the case where $N_{EP}$ is 288 and the number of subchannels is 2. FIG. 13 shows the case where $N_{EP}$ is 384 and the number of sub-channels is 2. FIG. 14 shows the case where $N_{EP}$ is 480 and the number of subchannels is 2. FIG. 15 shows the case where $N_{EP}$ is 480 and the number of subchannels is 3. FIG. 16 shows the case where $N_{EP}$ is 960 and the number of subchannels is 4. FIG. 17 shows the case where $N_{EP}$ is 960 and the number of subchannels is 5. FIG. 18 shows the case where $N_{EP}$ is 960 and the number of subchannels is 6. FIG. 19 shows the case where $N_{EP}$ is 960 and the number of subchannels is 8. FIG. 20 shows the case where $N_{EP}$ is 1920 and the number of subchannels is 9. FIG. 21 shows the case where $N_{EP}$ is 1920 and the number of subchannels is 10. FIG. 22 shows the case where $N_{EP}$ is 1920 and the number of subchannels is 13. FIG. 23 shows the case where $N_{EP}$ is 2880 and the number of subchannels is 12. FIG. 24 shows the case where $N_{EP}$ is 2880 and the number of subchannels is 13. FIG. 25 shows the case where $N_{EP}$ is 2880 and the number of subchannels is 15. FIG. 26 shows the case where $N_{EP}$ is 2880 and the number of subchannels is 20. FIGS. 28 to 30 additionally show the results of Step Dn QPSK obtained when the modulation order at retransmission was fixed as QPSK. Specifically, FIG. 27 shows the case where $N_{EP}$ is 1920 and the number of subchannels is 8, FIG. 28 shows the case where $N_{EP}$ is 1920 and the number of subchannels is 9, FIG. 29 shows the case where $N_{EP}$ is 1920 and the number of subchannels is 10, and FIG. 30 shows the case where $N_{EP}$ is 1920 and the number of subchannels is 13.

Referring to FIGS. 10 to 30, there are shown the system performance of the related art scheme (fixed ModOrder) in which the fixed modulation order is applied regardless of the number of retransmissions based on Table 1 and that of the proposed scheme (ModOrder Step Dn) in which the modulation order is lowered according to the number of retransmissions based on Table 2, when the initial data and retransmission data are transmitted with the determined number of subchannels (Sch) in particular $N_{EP}$. It is noted that the system performance of the proposed scheme is superior. With reference to FIGS. 27 to 30, it is noted that the system performance is even better when the modulation order is fixed as QPSK (Step Dn QPSK) in retransmission. Namely, it is noted that the system performance is further enhanced when the lowest modulation order is applied for retransmission.

As described above, the proposed non-adaptive HARQ of IR mode can enhance the efficiency of retransmission data by lowering a modulation order of retransmission data based on a modulation order applied for the initial data and transmitting the re-transmission data. In addition, by changing the number of allocated subchannels as well as the modulation order according to the number of retransmissions, data can be transmitted more reliably.

So far, the downlink data transmission has been described, but the proposed method can be also applicable as it is for uplink data transmission. The modulation schemes of QPSK, 16 QAM, and 64 QAM are assumed to be used for data transmission, but not limited thereto. Namely, various other modulation schemes such as BPSK (Binary-Phase Shift Keying), 8 PSK, and the like, may be used for downlink and uplink data transmission. In the above description, the maximum number of retransmissions is 3 times, but it may be variably determined according to systems.

Every function as described above may be performed by processors such as a micro-processor, a controller, a microcontroller, an ASIC (Application Specific Integrated Circuit), and the like, based on software coded to perform such functions or program codes. Designing, developing, and implementing the codes may be obvious to the person in the art based on the description of the present invention.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

The invention claimed is:

1. A data transmission method using a hybrid automatic repeat request (HARQ), the method comprising:
transmitting, by a device, a first transmission block which is a portion of bit streams of a mother codeword;
receiving, by the device, a retransmission request with respect to the mother codeword; and
transmitting, by the device, a second transmission block which is a bit stream subsequent to the first transmission block according to the retransmission request,
wherein a modulation order obtained from a first range of a modulation order product code rate (MPR) is applied to the first transmission block,
wherein a modulation order obtained from a second range of the MPR according to a number of retransmissions is applied to the second transmission block,
wherein the second range of the MPR is determined based on a linear offset and the first range of the MPR, and
wherein the linear offset is determined by
a first parameter that proportionally changes the modulation order obtained from the second range according to the number of retransmissions, or
a second parameter that changes the modulation order obtained from the second range per a constant.

2. The method of claim 1, wherein the modulation order obtained from the second range of the MPR is smaller than that obtained from the first range of the MPR.

3. The method of claim 1, wherein the mother codeword comprises systematic bits and at least one parity bit with a turbo code applied thereto.

4. The method of claim 3, wherein when the size of the systematic bits is $N_{EP}$, the number of unit resources including one transmission block is $N_{SCH}$, and the number of symbols included in a unit resource is $N_{sub}$, the MPR is represented by Equation shown below:

$$MPR = \frac{N_{EP}}{N_{sub} \cdot N_{SCH}}.$$

5. The method of claim 4, wherein the unit resource is a subchannel.

6. The method of claim 1, wherein the second range of the MPR is larger than the first range of the MPR.

7. The method of claim 1, wherein the first and second transmission blocks are transmitted through the same number of subchannels.

8. The method of claim 1, wherein the number of bits of the second transmission block is smaller than that of the first transmission block.

9. The method of claim 1, further comprising:
informing about parameters with respect to the first and second ranges of the MPR through a control channel.

10. A device configured to transmit data using a hybrid automatic repeat request (HARQ), comprising:
a communication device; and
a processor operatively connected to the communication device and configured to
transmit a first transmission block which is a portion of bit streams of a mother codeword,
receive a retransmission request with respect to the mother codeword, and
transmit a second transmission block which is a bit stream subsequent to the first transmission block according to the retransmission request,
wherein a modulation order obtained from a first range of a modulation order product code rate (MPR) is applied to the first transmission block,
wherein a modulation order obtained from a second range of the MPR according to a number of retransmissions is applied to the second transmission block,
wherein the second range of the MPR is determined based on a linear offset and the first range of the MPR, and
wherein the linear offset is determined by
a first parameter that proportionally changes the modulation order obtained from the second range according to the number of retransmissions, or
a second parameter that changes the modulation order obtained from the second range per a constant.

* * * * *